(12) United States Patent
Newell

(10) Patent No.: US 11,198,252 B2
(45) Date of Patent: *Dec. 14, 2021

(54) MULTIPLE AXIS ROBOTIC ADDITIVE MANUFACTURING SYSTEM AND METHODS

(71) Applicant: Stratasys, Inc., Eden Prairie, MN (US)

(72) Inventor: Clint Newell, Eden Prairie, MN (US)

(73) Assignee: Stratasys, Inc., Eden Prairie, MN (US)

( * ) Notice: Subject to any disclaimer, the term of this patent is extended or adjusted under 35 U.S.C. 154(b) by 239 days.

This patent is subject to a terminal disclaimer.

(21) Appl. No.: 16/327,204

(22) PCT Filed: Aug. 22, 2017

(86) PCT No.: PCT/US2017/048056
§ 371 (c)(1),
(2) Date: Feb. 21, 2019

(87) PCT Pub. No.: WO2018/039260
PCT Pub. Date: Mar. 1, 2018

(65) Prior Publication Data
US 2019/0262986 A1 Aug. 29, 2019

Related U.S. Application Data

(60) Provisional application No. 62/378,024, filed on Aug. 22, 2016.

(51) Int. Cl.
*B29C 64/118* (2017.01)
*B29C 64/209* (2017.01)
(Continued)

(52) U.S. Cl.
CPC ............ *B29C 64/379* (2017.08); *B25J 9/047* (2013.01); *B29C 64/106* (2017.08);
(Continued)

(58) Field of Classification Search
CPC .................................................. B29C 64/118
See application file for complete search history.

(56) References Cited

U.S. PATENT DOCUMENTS 5,866,058 A 2/1999 Batchelder et al.
5,939,008 A 8/1999 Comb et al.
(Continued)

FOREIGN PATENT DOCUMENTS

CN 20493622 U 1/2016
CN 105339154 2/2016
(Continued)

OTHER PUBLICATIONS

Canadian Office Action, 3034682, dated Feb. 4, 2020, 9 pages.
(Continued)

*Primary Examiner* — Atul P. Khare
(74) *Attorney, Agent, or Firm* — Peter J. Ims; Westman, Champlin & Koehler, P.A.

(57) ABSTRACT

A multiple axis robotic additive manufacturing system includes a robotic arm movable in six degrees of freedom. The system includes a build platform movable in at least two degrees of freedom and independent of the movement of the robotic arm to position the part being built to counteract effects of gravity based upon part geometry. The system includes an extruder mounted at an end of the robotic arm. The extruder is configured to extrude at least part material with a plurality of flow rates, wherein movement of the robotic arm and the build platform are synchronized with the flow rate of the extruded material to build the 3D part.

20 Claims, 16 Drawing Sheets

(51) Int. Cl.

| | | |
|---|---|---|
| B29C 64/227 | (2017.01) | |
| B29C 64/379 | (2017.01) | |
| B33Y 10/00 | (2015.01) | |
| B33Y 30/00 | (2015.01) | |
| B29C 64/295 | (2017.01) | |
| B25J 9/04 | (2006.01) | |
| B29C 64/106 | (2017.01) | |
| G06F 30/00 | (2020.01) | |
| B29C 64/241 | (2017.01) | |
| B33Y 40/00 | (2020.01) | |
| B33Y 70/00 | (2020.01) | |
| B29C 64/245 | (2017.01) | |
| B29C 64/30 | (2017.01) | |
| G06F 119/18 | (2020.01) | |

(52) U.S. Cl.
CPC .......... *B29C 64/118* (2017.08); *B29C 64/209* (2017.08); *B29C 64/227* (2017.08); *B29C 64/241* (2017.08); *B29C 64/245* (2017.08); *B29C 64/295* (2017.08); *B29C 64/30* (2017.08); *B33Y 10/00* (2014.12); *B33Y 30/00* (2014.12); *B33Y 40/00* (2014.12); *B33Y 70/00* (2014.12); *G06F 30/00* (2020.01); B29K 2995/004 (2013.01); B29K 2995/0039 (2013.01); G06F 2119/18 (2020.01)

(56) References Cited

U.S. PATENT DOCUMENTS

| | | | |
|---|---|---|---|
| 6,004,124 A | 12/1999 | Swanson et al. | |
| 6,054,077 A | 4/2000 | Comb et al. | |
| 6,274,839 B1 | 8/2001 | Stone et al. | |
| 6,547,995 B1 | 4/2003 | Comb | |
| 6,814,907 B1 | 11/2004 | Comb | |
| 7,122,246 B2 | 10/2006 | Comb et al. | |
| 7,127,309 B2 | 10/2006 | Dunn et al. | |
| 7,168,935 B1* | 1/2007 | Taminger | B29C 64/141 425/174.4 |
| 8,221,669 B2 | 7/2012 | Batchelder et al. | |
| 8,349,239 B2 | 1/2013 | Hopkins et al. | |
| 8,439,665 B2 | 5/2013 | Batchelder et al. | |
| 8,721,947 B2* | 5/2014 | Elyasi | B29C 33/48 264/219 |
| 8,801,990 B2 | 8/2014 | Mikulak et al. | |
| 8,920,697 B2 | 12/2014 | Mikulak et al. | |
| 8,926,484 B1 | 1/2015 | Comb et al. | |
| 8,955,558 B2 | 2/2015 | Bosveld et al. | |
| 8,974,715 B2 | 3/2015 | Hopkins et al. | |
| 9,085,109 B2* | 7/2015 | Schmehl | B29C 64/295 |
| 9,724,866 B2 | 8/2017 | Hopkins et al. | |
| 9,878,495 B2 | 1/2018 | Douglas et al. | |
| 9,910,935 B2 | 3/2018 | Golway et al. | |
| 10,041,612 B1 | 8/2018 | Korobkov | |
| 10,059,057 B2* | 8/2018 | Schirtzinger | B29C 70/682 |
| 10,076,876 B2* | 9/2018 | Mark | B33Y 40/00 |
| 10,077,854 B1 | 9/2018 | Korobkov | |
| 10,254,499 B1 | 4/2019 | Cohen | |
| 10,513,076 B1* | 12/2019 | Freakes | B33Y 30/00 |
| 10,688,581 B2 | 6/2020 | McQueen et al. | |
| 10,875,246 B2* | 12/2020 | Lee | B33Y 50/02 |
| 2002/0129485 A1* | 9/2002 | Mok | G05B 19/4099 29/527.2 |
| 2013/0089642 A1 | 4/2013 | Lipson et al. | |
| 2014/0191439 A1 | 7/2014 | Davis | |
| 2014/0197576 A1* | 7/2014 | Kraibuhler | B33Y 30/00 264/308 |
| 2014/0232035 A1 | 8/2014 | Bheda | |
| 2014/0291886 A1 | 10/2014 | Mark et al. | |
| 2015/0004274 A1 | 1/2015 | Ono | |
| 2015/0076739 A1 | 3/2015 | Batchelder | |
| 2015/0140151 A1 | 5/2015 | Schmehl et al. | |
| 2015/0145174 A1* | 5/2015 | Comb | G03G 15/24 264/464 |
| 2015/0183070 A1 | 7/2015 | Jones et al. | |
| 2015/0314532 A1 | 11/2015 | Gordon | |
| 2016/0001461 A1* | 1/2016 | Gardiner | E04G 11/00 264/219 |
| 2016/0031155 A1 | 2/2016 | Tyler | |
| 2016/0096327 A1* | 4/2016 | Fry | B29C 64/295 264/443 |
| 2016/0207263 A1 | 7/2016 | Gordon | |
| 2016/0263832 A1 | 9/2016 | Bui et al. | |
| 2017/0072633 A1 | 3/2017 | Hsu | |
| 2017/0087767 A1 | 3/2017 | Grewell | |
| 2017/0151728 A1* | 6/2017 | Kunc | B29C 70/222 |
| 2017/0157845 A1* | 6/2017 | Bihari | B29C 64/393 |
| 2017/0165915 A1* | 6/2017 | Deng | B33Y 30/00 |
| 2017/0232679 A1 | 8/2017 | Gardiner et al. | |
| 2017/0259502 A1 | 9/2017 | Chapiro et al. | |
| 2017/0334137 A1* | 11/2017 | Nystrom | B29C 64/118 |
| 2018/0001567 A1* | 1/2018 | Juan | B33Y 30/00 |
| 2018/0065208 A1 | 3/2018 | Mori et al. | |
| 2018/0085998 A1 | 3/2018 | von Burg | |
| 2018/0117836 A1 | 5/2018 | Reese et al. | |
| 2018/0117837 A1 | 5/2018 | Reese et al. | |
| 2018/0117838 A1 | 5/2018 | Reese et al. | |
| 2018/0117851 A1 | 5/2018 | Reese et al. | |
| 2018/0126637 A1 | 5/2018 | Tyler et al. | |
| 2018/0257302 A1 | 9/2018 | Kheng et al. | |
| 2018/0281278 A1 | 10/2018 | George et al. | |
| 2018/0326658 A1* | 11/2018 | Saito | B33Y 50/02 |
| 2019/0134913 A1 | 5/2019 | Buratto | |
| 2019/0210286 A1 | 7/2019 | Newell et al. | |
| 2019/0210287 A1 | 7/2019 | Newell | |
| 2019/0240903 A1* | 8/2019 | Isobe | B29C 64/245 |
| 2019/0351620 A1 | 11/2019 | Jaiswal et al. | |
| 2020/0055239 A1 | 2/2020 | Nixon et al. | |

FOREIGN PATENT DOCUMENTS

| | | |
|---|---|---|
| CN | 105339154 A | 2/2016 |
| CN | 104842557 B | 2/2017 |
| EP | 2998059 A1 | 3/2016 |
| GB | 2532024 A | 11/2016 |
| JP | 2002500584 A | 1/2002 |
| JP | 2005335380 A | 12/2005 |
| JP | 2016508086 A | 3/2016 |
| JP | 5937249 B1 | 6/2016 |
| JP | 2016141142 A | 8/2016 |
| JP | 2017100304 A | 6/2017 |
| KR | 1020160072182 A | 6/2016 |
| KR | 1020160089805 A | 7/2016 |
| WO | 2009057107 A2 | 5/2009 |
| WO | 2014127426 A1 | 8/2014 |
| WO | 2014153535 A2 | 9/2014 |
| WO | 2015193819 A2 | 12/2015 |
| WO | 2015193819 A3 | 12/2015 |
| WO | 2016014543 A1 | 1/2016 |
| WO | 2016019435 A1 | 2/2016 |
| WO | 2016116139 A1 | 7/2016 |
| WO | 2016119898 A1 | 8/2016 |
| WO | 2017210490 A1 | 12/2017 |
| WO | 2018039260 A9 | 1/2018 |
| WO | 2018039261 A1 | 3/2018 |

OTHER PUBLICATIONS

International Search Report and Written Opinion dated Jan. 16, 2018 for corresponding International Application No. PCT/US2017/048056, filed Aug. 22, 2017.

Zhai "Additive Manufacturing: Making Imagination the Major Limitation" Year: 2014.

U.S. Prosecution History for U.S. Appl. No. 16/327,199, filed Feb. 21, 2019 including: Non-Final Rejection dated Jan. 1, 2021 and Non-Final Rejection dated Mar. 15, 2021.

U.S. Prosecution History for U.S. Appl. No. 16/352,269, filed Mar. 13, 2019 including: Restriction Requirement dated Feb. 26, 2021.

(56) References Cited

OTHER PUBLICATIONS

Korean Office Action, application No. 10-2019-7008286, dated Feb. 27, 2020, 13 pages.
Japanese Office Action, Application No. 2019-092509, dated Jun. 30, 2020, 8 pages.
Canadian Office Action, Application No. 3,038,750, dated Aug. 26, 2020, 8 pages.
Japanese Office Action, Application No. 2019-510595, dated Sep. 23, 2020.
Japanese Office Action, Application No. 2019-510590, dated Sep. 23, 2020.
Chinese Office Action, Application No. 201780062984.8, dated Sep. 24, 2020.
Korean Office Action, Application No. 10-2019-7008283, dated May 7, 2020, 10 pages.
Japanese Office Action, Application No. 2019-510590, dated May 19, 2020, 4 pages.
Japanese Office Action, Application No. 2019-510595, dated May 19, 2020, 4 pages.
Communication pursuant to Art. 94(3) EPC from European Patent Application No. 17761412.0, dated Jun. 28, 2021.
Notice of Allowance and Fee(s) due from U.S. Appl. No. 16/352,269 dated Jul. 14, 2021.
Chinese Office Action for Chinese Application No. 2021041902421750, dated Apr. 22, 2021; 20 pages.
International Search Report and Written Opinion dated Nov. 29, 2017 for International Application No. PCT/US2017/048057, filed Aug. 22, 2017.
Extended European Search Report from European Patent Application No. 21185497.1, dated Oct. 22, 2021.

* cited by examiner

MULTIPLE AXIS ROBOTIC ADDITIVE MANUFACTURING SYSTEM AND METHODS

CROSS-REFERENCE TO RELATED APPLICATION

This Application is a Section 371 National Stage Application of International Application No. PCT/US2017/048056, filed Aug. 22, 2017 and published as WO2018/039260 on Mar. 1, 2018, in English, which claims the benefit of U.S. Provisional Patent Application Ser. No. 62/378,024, filed on Aug. 22, 2016, the contents of which are hereby incorporated by reference in their entirety.

BACKGROUND

The present disclosure relates generally to additive manufacturing, and more specifically to a multiple axis robotic build system.

Additive manufacturing, or 3D printing, is generally an additive manufacturing process in which a three-dimensional (3D) object is built utilizing a computer model of the objects. The typical operation consists of slicing a three-dimensional computer model into thin cross sections, translating the result into two-dimensional position data, and feeding the data to control a printer which manufactures a three-dimensional structure in a layerwise manner using one or more additive manufacturing techniques. Additive manufacturing entails many different approaches to the method of fabrication, including fused deposition modeling, ink jetting, selective laser sintering, powder/binder jetting, electron-beam melting, electrophotographic imaging, and stereolithographic processes.

Additive manufacturing technologies can be used for prototyping (where it has been used for many years) and also for end-use production parts. For end-use part production, it is desirable to print net-shape parts, or near-net shape parts (i.e., parts that match very closely to the digital image provided as a source data file, and therefore require little or no post-print processing to achieve the desired tolerances for the size and shape for the part).

In a fused deposition modeling system, a 3D printer creates a 3D printed part in a layer-by-layer manner by extruding a flowable part material along tool paths that are generated from a digital representation of the part. The part material is extruded through an extrusion tip carried by a print head of the system. The extruded part material fuses to previously deposited part material, and solidifies upon a drop in temperature. In a typical printer, the material is deposited in planar layers as a sequence of roads built up on a substrate that defines a build plane. The position of the print head relative to the substrate is then incremented along a print axis (perpendicular to the build plane), and the process is then repeated to form a printed part resembling the digital representation.

In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material can adhere to the part material during fabrication, and is removable from the completed printed part when the printing process is complete.

The use of layer-by-layer printing with optional support structure can result in parts that require long build times, extra post-processing, and require large amounts of support material. Further, parts built with layer-by-layer printing are limited in the geometries that may be printed while still providing parts of sufficient quality and strength for use in at least some industries.

SUMMARY

One aspect of the present disclosure includes a multiple axis robotic additive manufacturing system includes a robotic arm movable in six degrees of freedom. The system includes a build platform movable in at least two degrees of freedom and independent of the movement of the robotic arm to position the part being built to counteract effects of gravity based upon part geometry. The system includes an extruder mounted at an end of the robotic arm. The extruder is configured to extrude at least part material with a plurality of flow rates, wherein movement of the robotic arm and the build platform are synchronized with the flow rate of the extruded material to build the 3D part.

Another aspect of the present disclosure relates to a method of printing a 3D part with a multiple axis robotic build system. The method includes printing at least a portion of the part on a build platform along a 3D tool path with an extruder mounted on a robotic arm that moves in six degrees of freedom. The method further includes orienting the part by moving the build platform during printing based on a geometry of the part being printed separate from the movement of the robotic arm wherein the movement of the build platform and the movement of the robotic arm are synchronized to print the part without support structures.

Another aspect of the present disclosure relates to a method printing a 3D part in an out of oven printing environment. The method includes providing an extruder on a robotic arm having six degrees of freedom and providing a build platform movable in at least two axes of rotation. The method includes extruding at least a first segment of a first portion of the part along a first 3D tool path and extruding at least a second segment of a second portion of the part conformally to a surface of the first portion of the part along a second 3D tool path. Extruding a second portion of the part comprises locally pre-heating a portion of the first portion along the second 3D tool path of the second portion of the part prior to extruding on that portion of the tool path.

Definitions

Unless otherwise specified, the following terms as used herein have the meanings provided below:

The terms "preferred", "preferably", "example" and "exemplary" refer to embodiments of the invention that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a material", when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

The term "near-net part" refers to a part that is printed so that it is very close to its final shape after the initial printing. A near-net part matches closely to the digital image provided as a source data file, and therefore requires little or no post-print processing to achieve the desired tolerances for the size and shape for the part.

The term "out of oven" refers to a build environment that is not enclosed within a temperature controlled environmental chamber, but is used and operated outside the confines of an environmental chamber.

All cited patents and printed patent applications referenced herein are incorporated by reference in their entireties.

DETAILED DESCRIPTION

A system embodiment of the present disclosure uses motion of a robotic arm in six axes, and motion of a build platform in two axes, to allow printing orientation of a fused deposition modeling part to be determined based on the geometry of the part, and without the need for supporting structure. Defining print orientation based on part geometries enables improved control over part properties, such as strength and directionality of fiber in a composite print material, and allows printing of parts of higher quality in shorter amounts of time, and that require less post print processing.

The embodiments of the present disclosure provide for automated part production that change print-by-layer operations and enable true three-dimensional printing of an extruded material to allow additive manufacturing to be applied to near-net part structures without the need for additional finishing steps. In some instances the parts are printed from a single material. In other instances, the parts are printed using more than one material, resulting in a composite part, which can be of high commercial value. In other instances, the material composition can be blended or varied from one end of a part build to another, for delivery of a variety of part properties.

Figure 1:
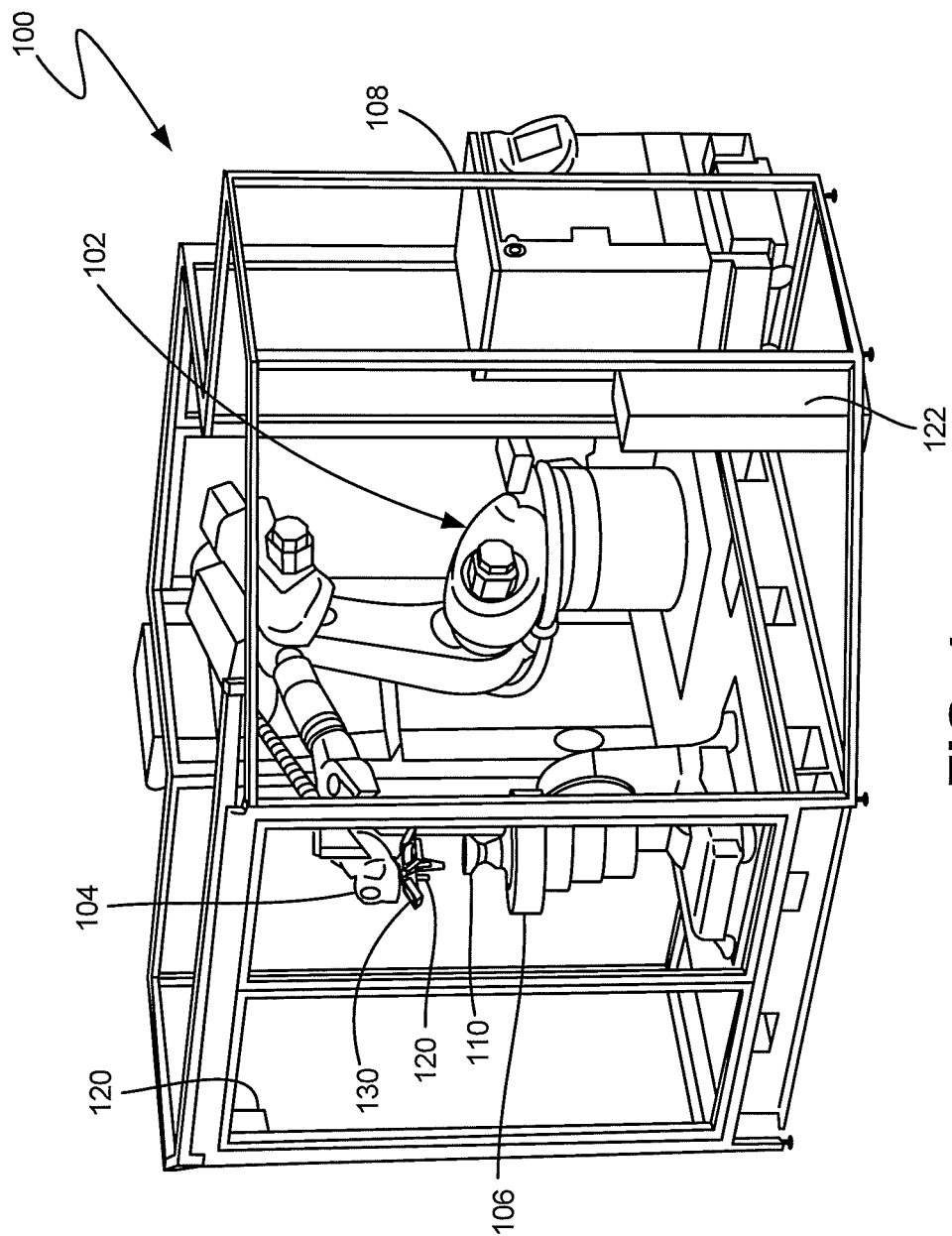
FIG. 1 is a perspective view of a multiple axis robotic build system according to an embodiment of the present disclosure.

FIG. 1 is a perspective view of a multi-axis robotic build system 100 that may be used for building three-dimensional (3D) parts. System 100 includes in one embodiment a robotic arm 102 capable of movement along six axes. An exemplary robotic arm is an industrial robot manufactured by KUKA Robotics of Augsburg, Germany. While six axes of motion are discussed for the robotic arm 102 from a stationary base, it should be understood that additional axes or other movements are also amenable to use with the embodiments of the present disclosure, without departing therefrom. For example, the robotic arm 102 could be mounted to move on a rail or a gantry to provide additional degrees of freedom.

The robotic arm 102 carries a print head 104, such as, by way of example only and not by way of limitation, an extrusion head 104 for printing parts from a filament feed stock, powder or pellet feed stock, or the like. In some instances, the feed stock is a polymer or copolymer which optionally can be loaded with secondary materials such as glass or carbon fiber, and impact modifiers. However, the present disclosure is not limited to the printing of parts with polymeric materials. Consumable materials that may be printed according to the present disclosure include, by way of example only and not by way of limitation, organic, inorganic and composite materials. Composite materials amenable to use with embodiments of the present disclosure include by way of example and not by way of limitation carbon fiber filled nylon, fiber reinforced thermoplastics, fiberglass reinforced thermoplastics, chopped or continuous composite fibers, and the like. The print head 104 may be an extrusion type print head, including by way of example only and not by way of limitation, a print head that utilizes a screw extruder such as is disclosed in Bosveld et al. U.S. Pat.

No. 8,955,558; a viscosity-pump liquefier such as is disclosed in U.S. Pat. No. 6,004,124; a ribbon liquefier such as is disclosed in Batchelder et al. U.S. Pat. No. 8,439,665; or a gear-pump liquefier such as is disclosed in Hjelsand et al. WO 2016/014543A1. Some representative consumable materials are disclosed in commonly-owned Batchelder et. al. U.S. Pat. No. 7,122,246; Mikulak et al. U.S. Pat. Nos. 8,801,990 and 8,920,697; Bosveld et al. U.S. Pat. No. 8,955,558; and Batchelder et al. U.S. Pat. No. 8,221,669.

A build platform 106 is provided, which in one embodiment is movable along two axes of rotation, rotation about the z-axis, and tilting (rotation) about the x-axis. Further axes of rotation may be provided with a different build platform 106, such as but not limited to tilting (rotation) in the y-axis, and various translations. Further, different build platforms with different axes of motion may also be used with the embodiments of the present disclosure without departing therefrom. Build platform 106 is provided in one embodiment with an extension 110 to offer more freedom of movement of the robotic arm 102 and print head 104 in the vicinity of the build platform 106. Build platform 106 could also comprise an additional robotic arm, also providing 6-axis movement, instead of being a fixed unit with 2-axis movement.

A controller 108 contains software and hardware for controlling the motion of the robotic arm 102 and the build platform 106, as well as the printing operation of the print head 104.

The robotic arm 102 with extruder 104 positioned thereon is used in combination with the build platform 106 in one embodiment of the disclosure. The eight (or more) axes of motion of the system 100 allow for the creation and printing of parts with complex geometries that could not previously be printed with, for example, fused deposition modeling systems that print in a plane, or could not be printed without the use of support structures. While six axes of motion are discussed for the robotic arm 102 from a stationary base, it should be understood that additional movements, such as providing a wider or longer print capability or extended range of motion by mounting the robotic arm or build platform on a rail, a movable platform, or the like, are also amenable to use with the embodiments of the present disclosure, without departing therefrom. For example, the robotic arm 102 could be mounted to move on a rail or a gantry to provide additional range of motion. Further, different tables with different motion platforms may also be used with the embodiments of the present disclosure without departing therefrom. Examples of such additional motion platforms include by way of example only and not by way of limitation, trunnion tables, cradles, rail or gantry mounted motion platforms, and the like.

For printing using different materials for different portions of a part being built or when a new tool is required, automated tool changing may be used. Such automated tool changing allows for additional operations, including by way of example and not by way of limitation, further additive manufacturing, subtractive manufacturing, finishing, inspection, and assembly of parts. A tool change rack is schematically illustrated at 122 in FIG. 1, and by way of example may be configured such as disclosed in Comb et al. U.S. Pat. No. 8,926,484. A tool change rack such as rack 122 may hold additional tools, extruders, subtractive elements, or the like. Exemplary subtractive elements may include without limitation a radiation-emitting device, such as an excimer laser device as is disclosed in Batchelder U.S. Patent Publication No. 20150076739. It should be understood that the tool change rack 122, while shown in one position, may be positioned elsewhere provided it is accessible to the robotic arm, without departing from the scope of the disclosure.

A generated tool path is utilized to control motion of the robotic arm 102. However, control of the extrusion head is also used to accurately deposit material along the generated tool path. For example, one embodiment of the present disclosure synchronizes timing of the motion of the robotic arm 102 with print head 104 to extrusion from the print head 104. Embodiments of the present disclosure provide for speed up or slow down of printing, changing the extrusion rate in conjunction with robotic movements, tip cleaning, tip changing, and other actions of the print head 104 based on the generated tool path and motion of the robotic arm 102. As an example, extrusion from the print head 104 may be synchronized with motion of the robotic arm 102 in manners taught by Comb et al. U.S. Pat. No. 6,054,077; and Comb U.S. Pat. Nos. 6,814,907, 6,547,995, and 6,814,907.

For instance, when printing around a corner of a part, the speed of the robotic arm 102 and the extrusion flow rate may be decreased to provide accurate deposition of the part. However, when printing along straight tool paths, the speed of the robotic arm 102 and the extrusion flow rate may be increased while maintaining dimensional accuracy of the part being printed. Additionally, the material can be extruded in thicker beads at faster rates in internal areas of the 3D extruded part volume that do not affect the print quality of the part. Therefore, hollow 3D parts, 3D parts with sparse-filled internal volumes, and or solid 3D parts can be printed with increased speed and extrusion flow rates without affect the quality of the 3D part(s) being printed. Sparse-filled internal volumes include infill patterns which may be printed in order to add desired stiffness to thin-walled structures. An infill pattern may be uniform throughout a part, or may be varied within layers or regions of a part. Two types of infill patterns are common in fused deposition modeling 3D printing using planar tool paths, and can also be utilized in printing 3D tool paths: (1) direction-parallel infills that use short, parallel line-segments to fill the interior of an outer part contour; and (2) contour infills that continuously offset the outer part contour to fill the interior. The density of material can be altered by varying the space between these line segments, thus creating infills that may range from being sparse, to moderate, to fully dense.

The multiple axes of motion of the robotic arm 102 and build platform 106 allow for the printing of parts that are oriented not just in one single build plane. The use of build planes which change during printing allow the 3D parting being printed to utilize gravity for support, if desired. Utilizing gravity to print the 3D part reduces or eliminates the need for support structure to account and compensate for the effects of gravity. This reduces the time to build a part, and reduces post-processing time of parts. The use of a robotic arm 102 and print head 104 also allows for printing upside-down as the build substrate changes in orientation, in which the print head extrusion may oppose gravity during at least portions of the build process.

Advantageously, the multiple axes of motion for the robotic arm 102 and the build platform 106 can utilize complex tool paths for printing 3D parts, including single continuous 3D tool paths for up to an entire part. A single 3D tool path such as those available with the multi-axis system 100 of the present embodiments serves to reduce issues with traditional additive manufacturing type printing, such as stair-stepping (layer aliasing), seams, the requirement for supports, and the like. Further, without a requirement to slice a part to be built into multiple layers all printed in the same plane, the geometry of the part may be used to determine the orientation of printing. Therefore, part strength and consistency is improved, and build time is shortened due to a more efficient and continuous tool path. The part can be printed with enough accuracy that it does not need further milling or fabrication, also known as "near-net" printing. Continuous tool paths also serve to improve consistency and accuracy of molten resin flow through the extruder because the extruder does not have to start and stop.

While some parts can be printed utilizing a single continuous 3D tool path, the multi-axis system can also be utilized to print 3D part utilizing planar tool paths and 3D part utilizing a combination of 3D tool paths and planar or 2D tool paths. Further, the system 100 can print hollow parts, sparse filled parts and solid parts. When utilizing a planar or 2D build path, a seam in the perimeter of the portion of the 3D part being printed can be minimized utilizing tool paths and methods disclosed in Hopkins et al. U.S. Pat. Nos. 8,349,239, 8,974,715 and 9,724,866. The present system 100 provides the necessary capability and flexibility to print a wide variety of 3D parts with enhance extrusion flow rates, reduced build times and larger build envelopes than a typical extrusion based additive manufacturing system.

Embodiments of the present disclosure use thermal management for printing along the tool path. In one embodiment, localized pre-heating of the tool path ahead of the print head is utilized. The use of a localized pre-heating operation enables elimination of a controlled thermal chamber environment or a reduction in of the temperature in the build environment. Localized pre-heating is performed in one embodiment with pre-heater 120. In one embodiment, pre-heater 120 is positioned on, ahead, or near the print head 104 to provide local pre-heating of the tool path on a previously printed portion of the 3D part ahead of the print head. In another embodiment, pre-heater 120 is positioned away from the print head, in a position such as on a frame or the like, in view of the printing area. Localized pre-heating along the tool path of the previously printed portion of the 3D part may be performed with a pre-heater using suitable pre-heating apparatus, including by way of example and not by limitation laser pre-heating, hot gas pre-heating, induction pre-heating, microwave pre-heating, and ultrasonic pre-heating. It should be understood that a pre-heater 120 may be positioned elsewhere in view of the print head and tool path without departing from the scope of the disclosure, for example on a second robotic arm or the like. Pre-heating serves to heat the intermediate part surface on which the new material is to be printed (such as along the single tool path for either a first portion or a second conformally printed portion on the first portion) sufficient for good adhesion of material to existing material. Part strength can be manipulated with such multi-layer heating treatments. Pre-heating may be performed for any portion of the part being built, including for first and second portions thereof.

Depending upon the size of the bead being extruded and the speed of the print head on the robotic arm 102, the amount of heat and the depth of heat penetration into the part imparted by a pre-heater 120 can vary. For instance, when moving at a relatively fast speed with a smaller bead, then the heat is imparted into surface of the part without significant penetration into the previously printed layer. When the penetration of the heat into the part is minimized, then the need for cooling of the just extruded material may or may not be required. However, when extruding larger beads at slower speeds, the heat tends to penetrate into the part being printed. Over time, if the heat is not removed from the part being printed, the heat will accumulate to cause the part to become thermally unstable and deform.

Cooling quickly after deposition can be customized to remove a previously supplied amount of heat energy (either from a hot large bead that cannot cool quickly, or from a localized pre-heat) to a localized area, to return the localized regional temperature to its original temperature prior to the pre-heat; in essence, quickly 're-balancing' the local thermal energy input in order to avoid part deformation. Localized cooling can be provided in the present invention, utilizing a cooling fluid including cooling gas or a cooling liquid that phase transitions to a gas, such as but not limited to liquid nitrogen. In one embodiment by cooling fans 130 mounted proximate the print head to move ambient air over the just printed part material. Localized cooling may also be employed since, in some embodiments and along some tool paths, the single tool path crosses over an area of the part 300 that has not had sufficient time to cool on its own before another pass of the print head over a previous part of the tool path. Localized cooling in one embodiment is based on known tool paths and geometries, as some geometries will be more likely to not cool sufficiently before the tool path returns. Localized pre-heating of a previous road just prior to deposition of a new bead or road, followed by subsequent removal of that pre-heating energy with post-cooling, in a rapid cyclic fashion, allows for significantly increased adhesion of layers in the z-direction, while not increasing part deformation.

Methods of printing include printing additional portions of a part on top of a first existing part portion, and in some embodiments along different axes. Crossing the print axis, such as the z-axis, for example, with a solid layer of material printed conformally to the existing layer, provides the ability to create strong structures.

It should be understood that a controlled build environment could be used with embodiments of the present disclosure instead of an out-of-oven environment. However, local heating and cooling to provide thermal management are acceptable in many printing applications. As extrusion volume rates and manufacturing configurations become larger, controlled chamber cooling is not always feasible.

Embodiments of the present disclosure are amenable to use with composite printing materials. The use of composites in various industries is increasing, as composites can provide numerous benefits over metals or other materials. Composites typically weigh less than traditional parts made of steel or the like. In some industries, for example and not by way of limitation transportation, oil and gas, and medical, composite materials may be used to make strong yet lightweight structures. However, previous additive manufacturing systems are constrained by labor-intensive processes and geometric limitations.

Printing with composite materials, as is provided by the embodiments of the present disclosure, provide lower part weight which directly translates to reduced fuel consumption, reduced operating costs, and the like. Printing of composite parts allows for customization without expensive retooling, assembly consolidation, topology improvements, reduced overall part costs due to reduction in tooling expense and scrap, elimination of lifetime part buys for stocking, and the like. The properties of composites used in printing allow for printing with reduced amount of curl and increased strength. Should 3D printing with the embodiments of the present invention be performed with thermoplastics, curl compensation via temperature control may be employed without departing from the scope of the disclosure. Curl control is not discussed further herein.

Composites also provide the ability to print reinforced parts, with fiber content in the composites, such as chopped fibers, short, medium, and full length continuous fibers, incorporated into a thermoplastic material, either prior to or during extrusion. With composite materials, and the provided multi-axis robotic build system 100, true near-net 3D printing may be achieved. Printing, for example, can be performed in nearly any orientation of a print head 104, with controlled extrusion along a single tool path. Further, printing may be configured to provide additional strength to a part, since orientation of fibers may be configured for different portions of the part, or for different sub-structures of the part.

Integration of tool paths generated by a CAD system for robotic movement are in one embodiment translated into extrusion protocols for the motion paths that are generated. That is, once a robot motion path is generated, extrusion control is used to adjust print parameters to properly print along the generated continuous tool path. Such parameters include by way of example only and not by way of limitation, print speed, extrusion rate, and the like.

Figure 2:
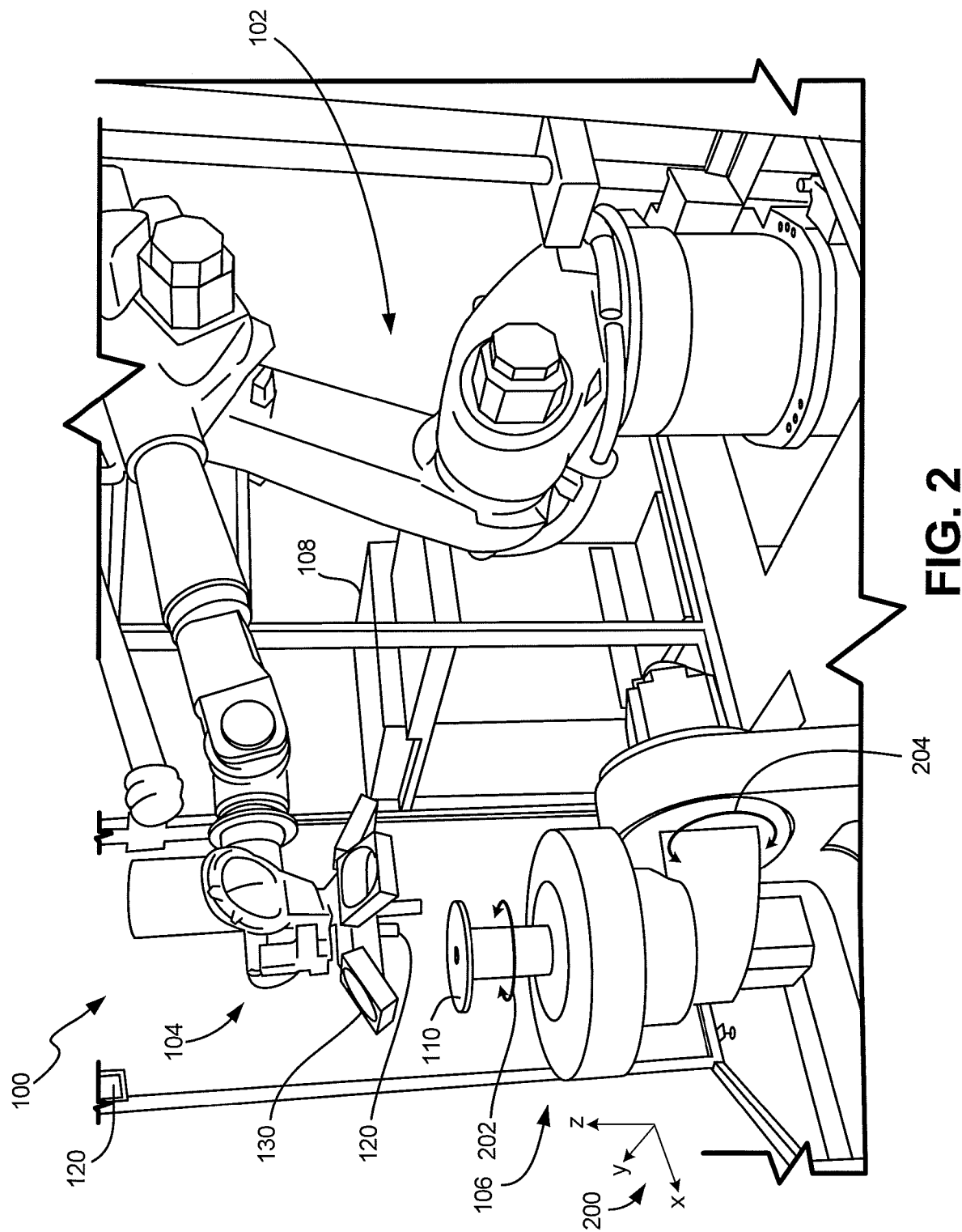
FIG. 2 is an enlarged perspective view of the system of FIG. 1.

FIG. 2 is a close-up view of a portion of system 100 showing axis map 200 with arrows 202 and 204 representing rotation of the build platform 106 about the z- and x-axes, respectively. The use of the multiple axis robotic arm 102 and the multiple axis build platform 106 allow for orientation of a part being printed to rely on gravity in lieu of at least some printed support material. Specifically, a part being printed can, with the multiple axis build platform 106, be oriented so that features of the part being printed are printed to reduce the likelihood of sagging or failure due to lack of support. When an air flow source is directed toward the newly deposited tool path region, the part will cool more quickly and also enable quicker fabrication of complex shapes. Examples of parts printed with a system such as system 100 are described below and include, but are not limited to hollow parts printed with one or more continuous three-dimensional tool path, a part printed with a portion printed 3D tool path another portion printed with planar tool path. The illustrated 3D parts are exemplary and non-limiting in nature where the present system 100 can print solid parts, hollow parts, sparse filled parts and combinations thereof. Some thermoplastic near-net parts that would require support in a typical fused deposition modeling-type printing system may not even need orientation to account for gravity, but may be printed directly with motion of the robotic arm 102 without tilting of the build platform 106.

Figure 3:
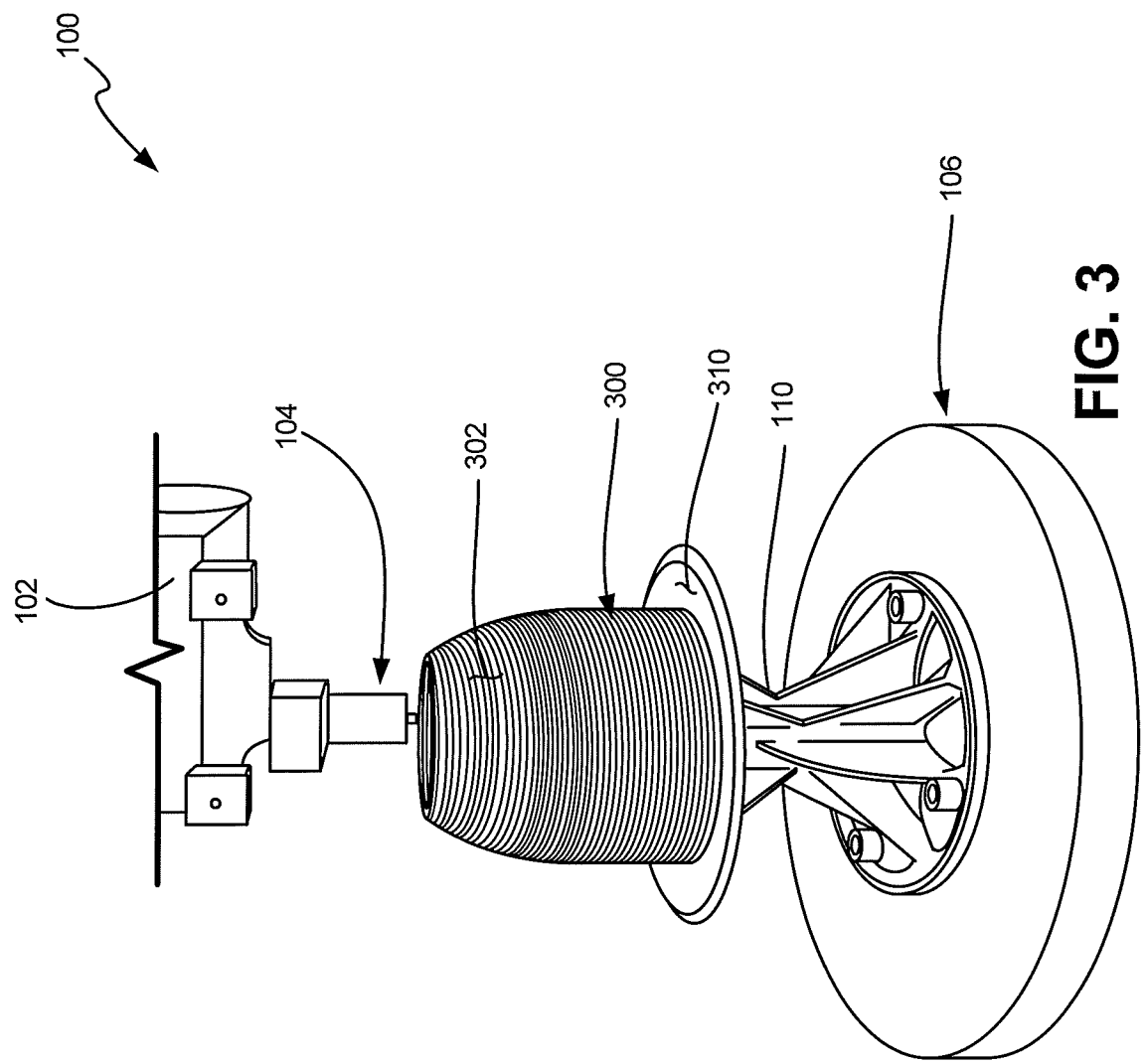
FIG. 3 is a perspective view of a part being printed on the system of FIG. 1.

FIG. 3 shows a multi-axis robotic build system 100 in process of building a part 300. Part 300 is, in this embodiment, built on the build platform 106, extended portion 110, and a build sheet 310. The build sheet 310 is removably adhered to the build platform 106, such as by way of example adherence by vacuum force as is disclosed in Comb et al., U.S. Pat. No. 5,939,008. The build sheet 310 provides a removable substrate on which to build the part 300. Other print foundations are known and may be used in place of the sheet substrate, for example, a build substrate, which may be a tray substrate as disclosed in Dunn et al., U.S. Pat. No. 7,127,309, fabricated from plastic, corrugated cardboard, or other suitable material, and may also include a flexible polymeric film or liner, painter's tape, polyimide tape, or other disposable fabrication for adhering extruded material onto the build platform 106.

Part 300 is printed in one embodiment with a continuous 3D tool path. That is, a portion or entirety of part 300 may be printed using a single tool path, not a series of sliced layers. For example, printing may be in a helical pattern, with gradually increasing height, yet printed with a single continuous extrusion of material from print head 104. For example, to print part 300, the robotic arm 102 could move and the build platform 106 could be stationary. However, the build platform 106 could rotate x-y plane, gradually increasing in z.

It will be understood that combinations of motion of the robotic arm 102 and build platform 106 may be made to provide for the printing of parts or parts in changing build orientations, including parts that would normally use support structures, without the use of support structures. It is also understood changes in extrusion rates can be synchronized with either movement of the robotic arm 102 or the build platform 106 or both the robotic arm 102 and the build platform 106 based upon the part geometry to accurately print the parts near net.

The ability to orient a part being printed in a specific chosen orientation, via motion along multiple axes of the build platform 106, as well as the axes of motion for the robotic arm 102, provide embodiments of the present disclosure that allow printing of a part along multiple axes, including axes that are oriented in different directions, such as but not limited to normal to each other. Such different axes, along with the use of composite materials such as those containing continuous fibers or known fiber orientations, allows for the printing of parts that have higher continuity with improved strength. That is, in embodiments of the present disclosure, a first portion of a part may be printed with an orientation of printed material along one axis, for example the x-axis, and a second portion of the same part may be printed with an orientation of printed material along a second axis, for example the z-axis. Still further, embodiments of the present disclosure provide the ability to conformally print layers of material on already laid down material, along a different axis.

Figure 4:
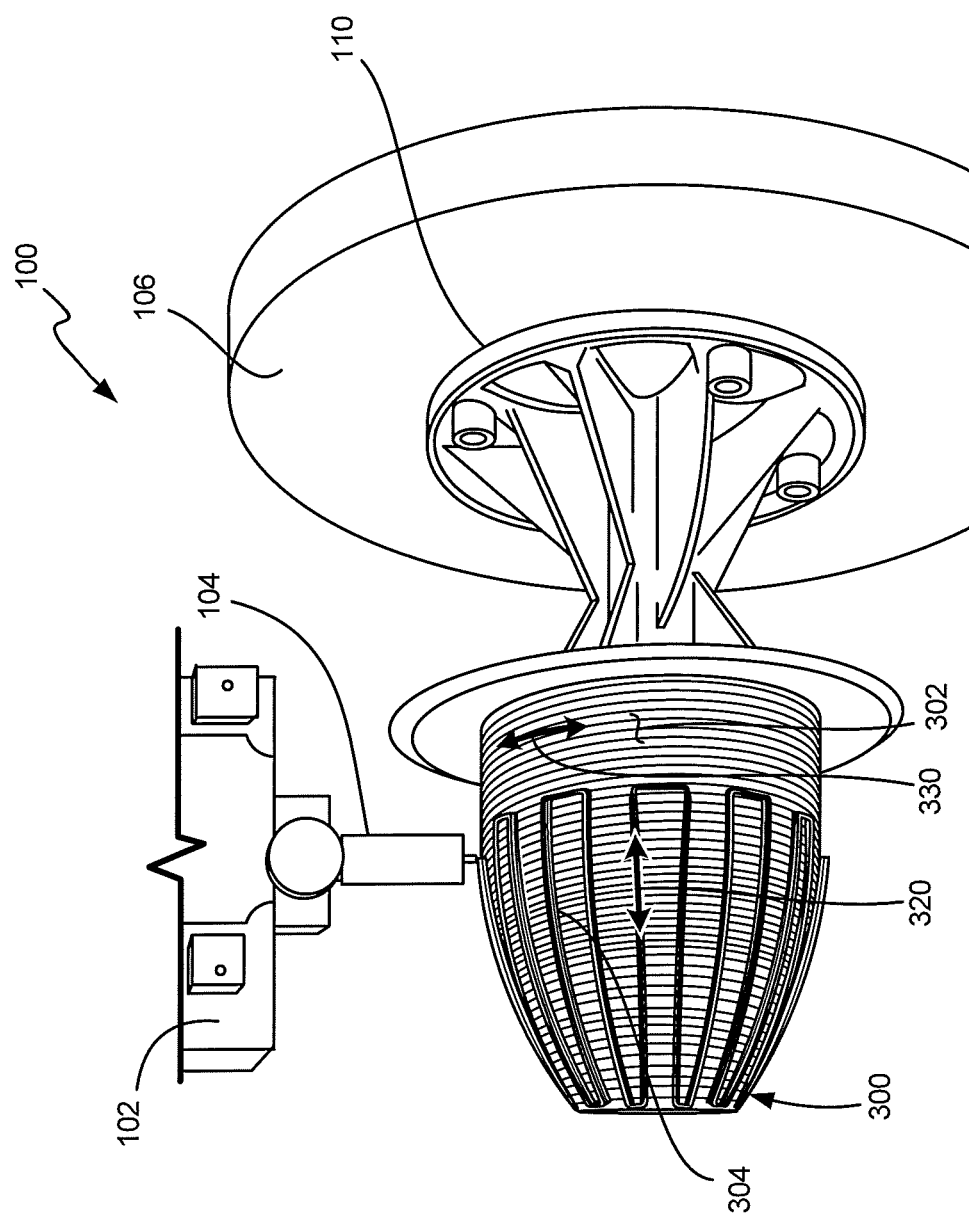
FIG. 4 is a perspective view of the part of FIG. 3 being printed on the system of FIG. 1, with a tilted build platform according to an embodiment of the present disclosure.
Figure 5:
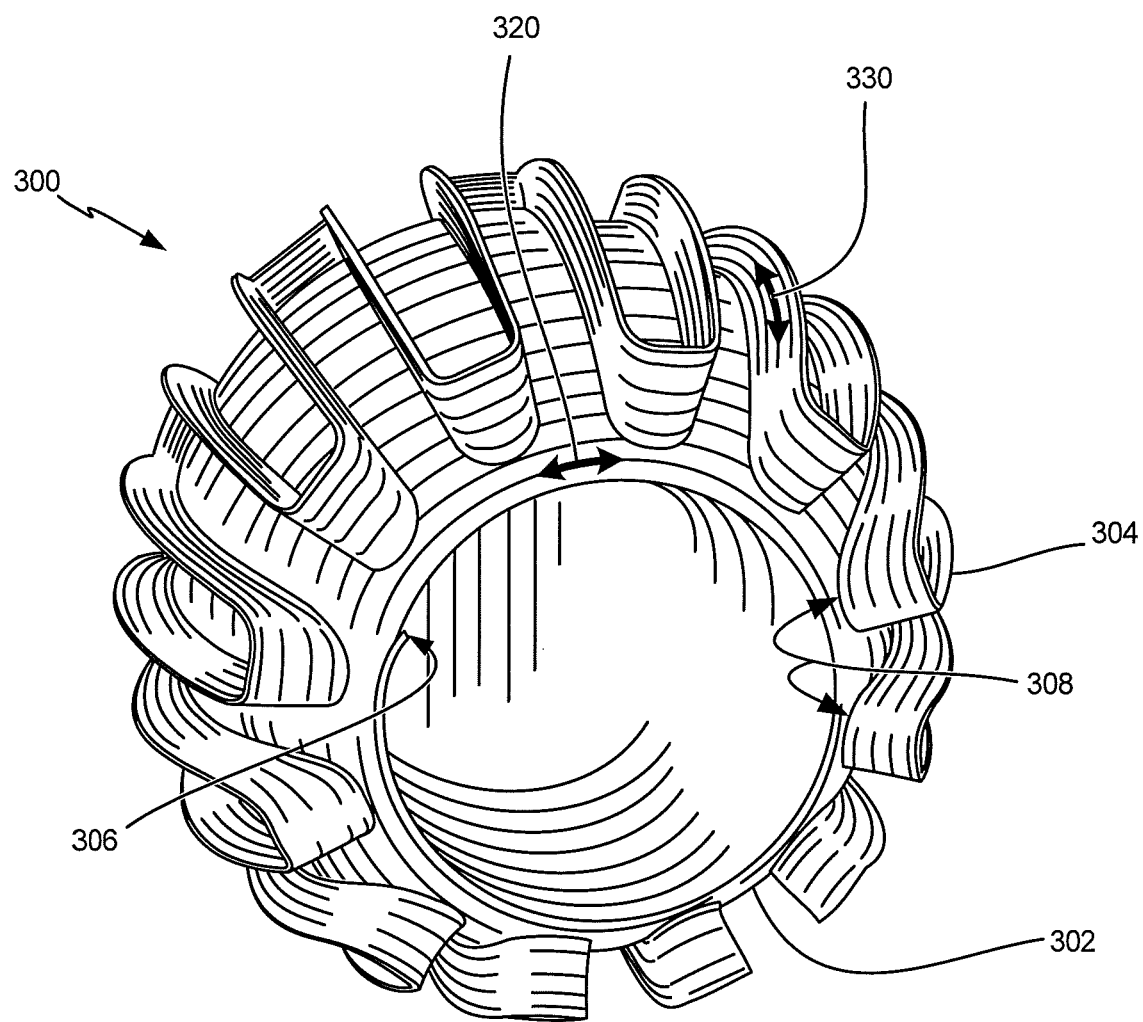
FIG. 5 is a perspective view of a part printed with an embodiment of the present disclosure.

FIG. 4 shows further printing of part 300, after printing of a first portion 302 thereof, comprising in this embodiment a dome shaped portion. Portion 302 is formed in this embodiment with a single 3D tool path printing operation. An end 306 of the tool path over which portion 302 is printed is shown in FIG. 5. Following printing of the first portion 302 of part 300, the build platform 106 is rotated about the x-axis to allow for the printing of a second portion 304 of the part 300. Second portion 304 is in one embodiment a series of ribs with their printing direction substantially perpendicular to the printing direction of the first portion 302 (see FIGS. 5 and 6 for additional views of part 300). The embodiments of the present disclosure allow for this type of printing of a first portion of a part along one axis, followed by conformal printing of a second portion of the part along a second, different axis, than the first portion 302. Conformal printing of portion 304 to portion 302 is along portion contact edge 308. Contact edge 308 is the edge along which portion 304 is initially conformally printed to portion 302.

One skilled in the art would understand that a second portion of a part added upon a previously built portion of the part would generally differ in temperature, and thus, also have challenges with respect to adherence. Temperature control of the build space would generally be used as described herein to allow for strong adherence between the two portions. Through the use of a localized pre-heating source (e.g., pre-heater 120) prior to deposition of material of the second tool path portion 304 being printed on the first portion 302, pre-heating or annealing of the surface along the tool path for the second portion 304 is performed. One of skill in the art would recognize that while some ranges of time and/or distance from pre-heating to printing are described herein, that different materials will have different temperatures and heating and cooling rates, that determination of time ranges is material dependent, and that such determination is within the scope of the disclosure and the skill of one of skill in the art.

FIGS. 5-8 show representative parts printed using apparatus and method embodiments of the present disclosure.

Figure 6:
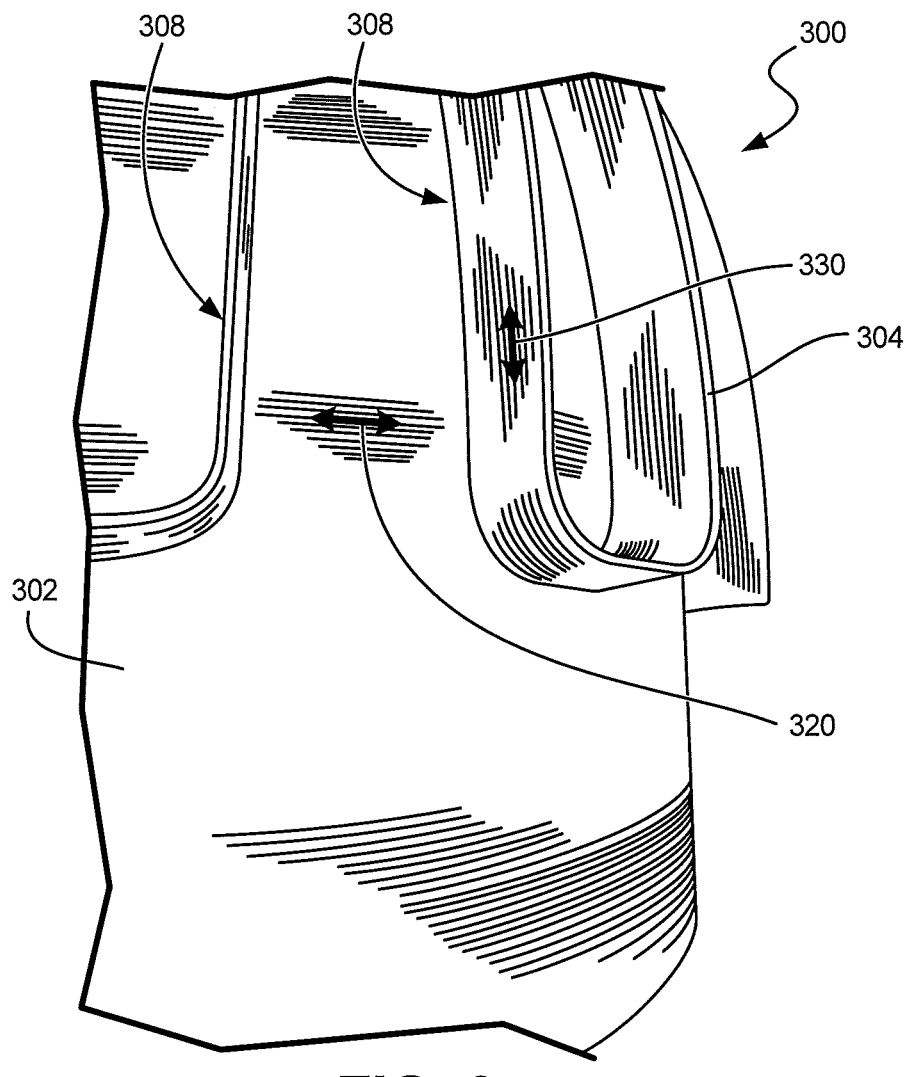
FIG. 6 is a close-up perspective view of a portion of the part of FIG. 5.

FIGS. 5 and 6 show further details of part 300. The tool path for first portion 302 is in one embodiment a single tool path. The tool path for the second portion 304 is in one embodiment a single 3D tool path. In a single 3D tool path printing operation for a portion of the part, typically comprising a portion that would be required to be printed in multiple sliced layers in an additive manufacturing system, the entire portion is printed in a single path. In the part 300, for example, portion 302 is printed with a single 3D tool path in a general axis indicated by arrow 320. Then, following printing of portion 302, portion 304 is printed conformally to portion 302 in a different single tool path printing operation. Portion 304 is printed in a general axis indicated by arrow 330. However, it should be noted that certain parts of the portions may be printed along the same axis. The nature of true 3D printing allows such printing, since the six axes of motion of the robot, supplemented by additional motion of the robot or build platform to expand the range of motion, allow for printing in different directions relative to earlier extruded material, including the printing of conformal portions of a part onto existing portions of the part.

Figure 7A:
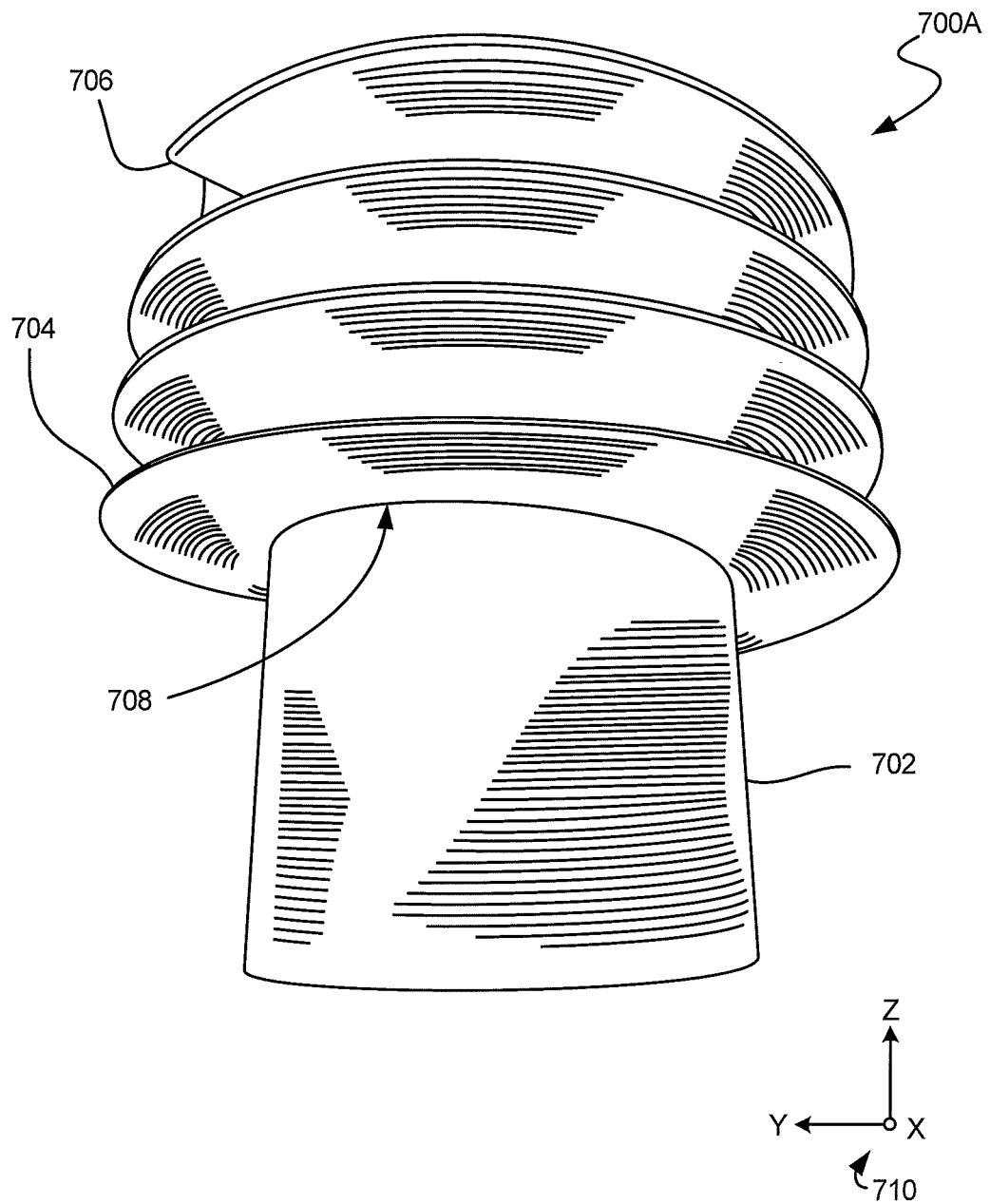
FIG. 7A is a perspective view of another part printed with an embodiment of the present disclosure.
Figure 8:
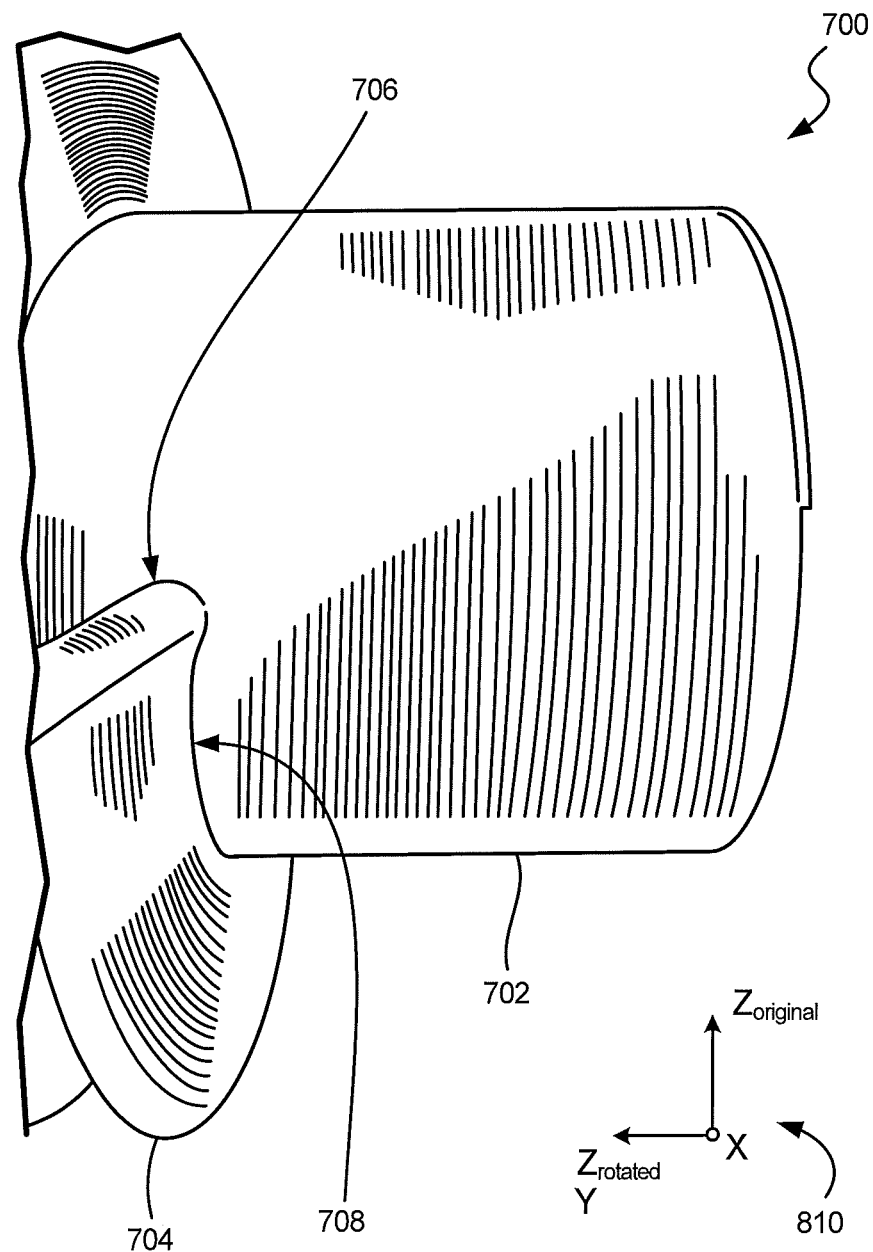
FIG. 8 is a close-up perspective view of a portion of the part of FIG. 7A.

Referring to FIGS. 7A and 8, part 700A is printed in a similar fashion as part 300, with first portion 702 being printed first using a single 3D tool path in a helix, printed using the robotic arm 102, print head 104, and build platform 106, with the part 700A oriented with respect to the axis map 710. Following completion of printing of first portion 702, second portion 704 is printed on first portion 702, conformally therewith beginning at contact edge 708. Second portion 704 of part 700A is printed in one embodiment with part 700A tilted along the x-axis, with the print head 104 printing a single tool path in a helix along the rotated z-axis (e.g., rotation about the x-axis to align the $z_{rotated}$ axis 90 degrees about the x-axis from the $z_{original}$ axis as shown in axis map 810) while the part 700A is rotated about the original z-axis. When an apparent end 706 of the path is reached, the print head 104 is indexed in the original x-axis (now the z-axis) without requiring re-registration of the print head, and printing on the single tool path continues back over the just printed part of the portion 704. In this way, the apparent end 706 is not an end of the tool path, but is simply a part of the tool path while printing continues.

Figure 7B:
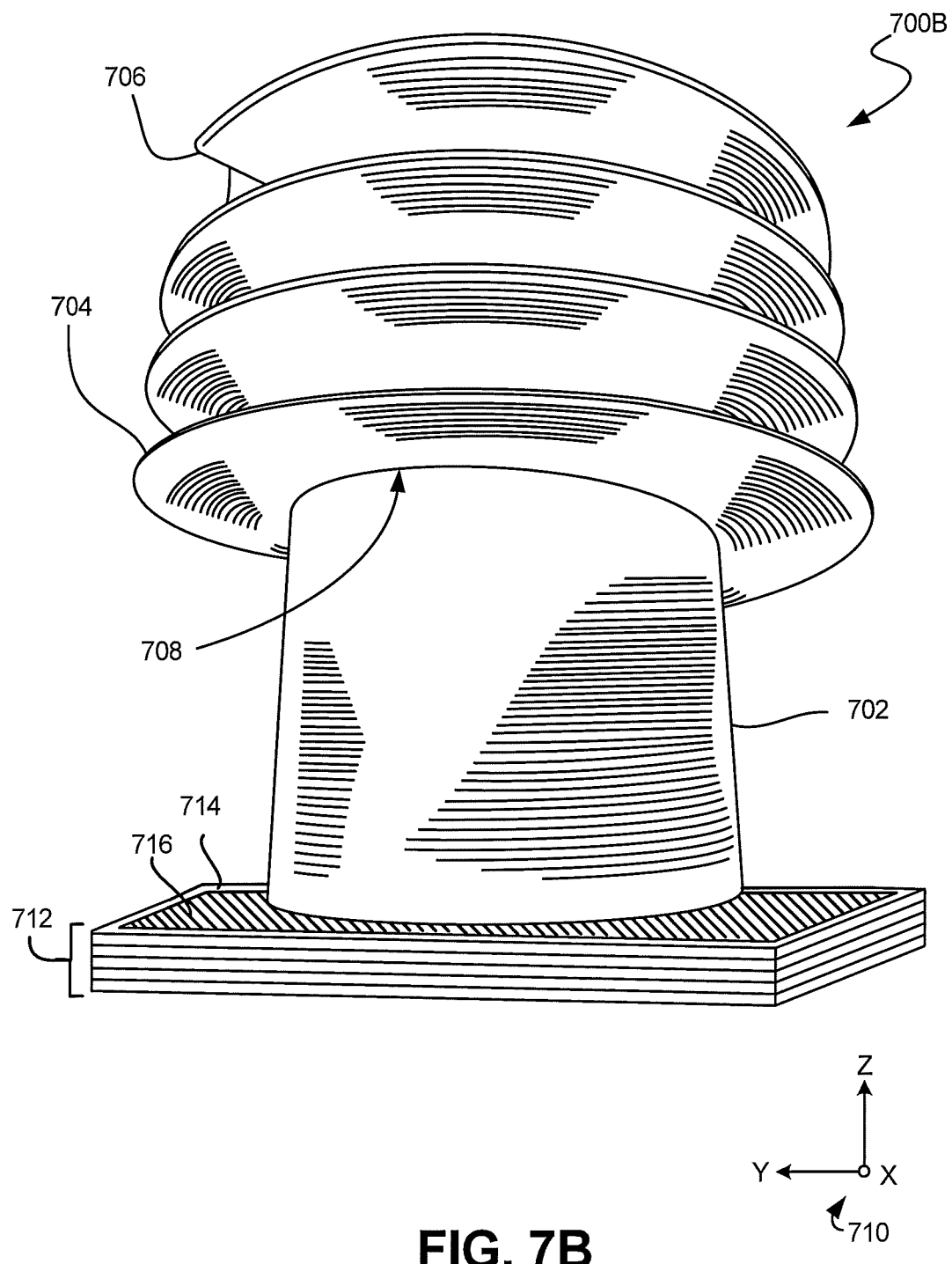
FIG. 7B is a perspective view of the part of 7A with an additional portion printed in a planar layer-by-layer manner.

Referring to FIG. 7B, the part 700B is printed in a similar manner as described with respect to the part 700A where the first portion 702 and the second portion 704 are constructed utilizing continuous 3D tool paths. The part 700B includes a substantially solid base constructed of a plurality of planar layers 712. Each layer includes a boundary 714 extruded about a perimeter of the base and a substantially solid interior region that is filled utilizing a raster tool path 716. A seam in the boundary 714 of the portion of the 3D part being printed can be minimized utilizing tool paths and methods disclosed in Hopkins et al. U.S. Pat. Nos. 8,349, 239, 8,974,715 and 9,724,866.

FIG. 7B illustrates that the system 100 can be utilized to print portions of parts with continuous 3D tool paths, planar tool paths and combinations thereof. The parts or portions of the parts can be hollow, sparse filled and/or solid depending upon the geometry and features of the part being printed.

A method of printing a part according to an embodiment of the present disclosure includes printing a part along a single tool path using a robotic arm capable of moving in six axes on a build platform capable of moving in at least two axes, with controlled extrusion along the single tool path and localized pre-heating of the tool path prior to printing. Printing a second portion of the part is performed conformally on a first portion of the part, including printing in a second axis different than the first axis. What is meant by printing conformally is that at least the first layer of the second portion conforms to a surface of the first portion.

Methods of the present disclosure include aligned direction of building of a portion of the part followed by aligned direction of building another portion of the part along a different axis, with controlled extrusion depending upon tool path, tool speed, and pattern.

Printing according to an embodiment includes analysis of the geometry of the part to be built, choosing the axis of printing based on the analysis of the geometry to build along a single tool path or multiple tool paths. In so doing, the orientation of the part during printing is controlled to rely on gravity so that supports which are typically used in printing parts are not necessary.

With embodiments of the present disclosure, printing may be performed with the print head 104 in any orientation, including upside down. This allows for the geometry of the part to be used to determine the orientation of the build platform with respect to the print head during printing. During a build, it may be advantageous to use a cooling fluid such as ambient or cooled air (or other gas) flow or a cooling liquid that transforms to a gas at process temperatures, such as liquid nitrogen, to be directed at the recently extruded material, such as by cooling with fans 130 as described above. Higher airflow or other forced gases may enable quicker solidification of shapes which would normally oppose gravity during the build. Utilizing a cooling fluid also allows for higher extrusion rates because the part being printed is maintained at a thermally stable temperature.

Utilizing pre-heating along the tool path, followed by extrusion of the material imparts heat into the part in a localized region. The cooling fluid can be used to remove the heat from the local region to thermally manage the printing of the part.

Printing with a print head 104 in any orientation allows for geometry of a part that is being printed to determine the print path. That is, a traditional layer by layer printing using multiple sliced layers for printing a part can lead to situations in which the part requires a significant amount of support, or in which the layer by layer approach results in a part that fails to have a structural form that is sufficient for its purposes. Further, complex parts can be very difficult to print in a traditional layer by layer printing process, due to the inability of support structures to provide proper support, or for the finished part to meet quality standards.

Figure 9:
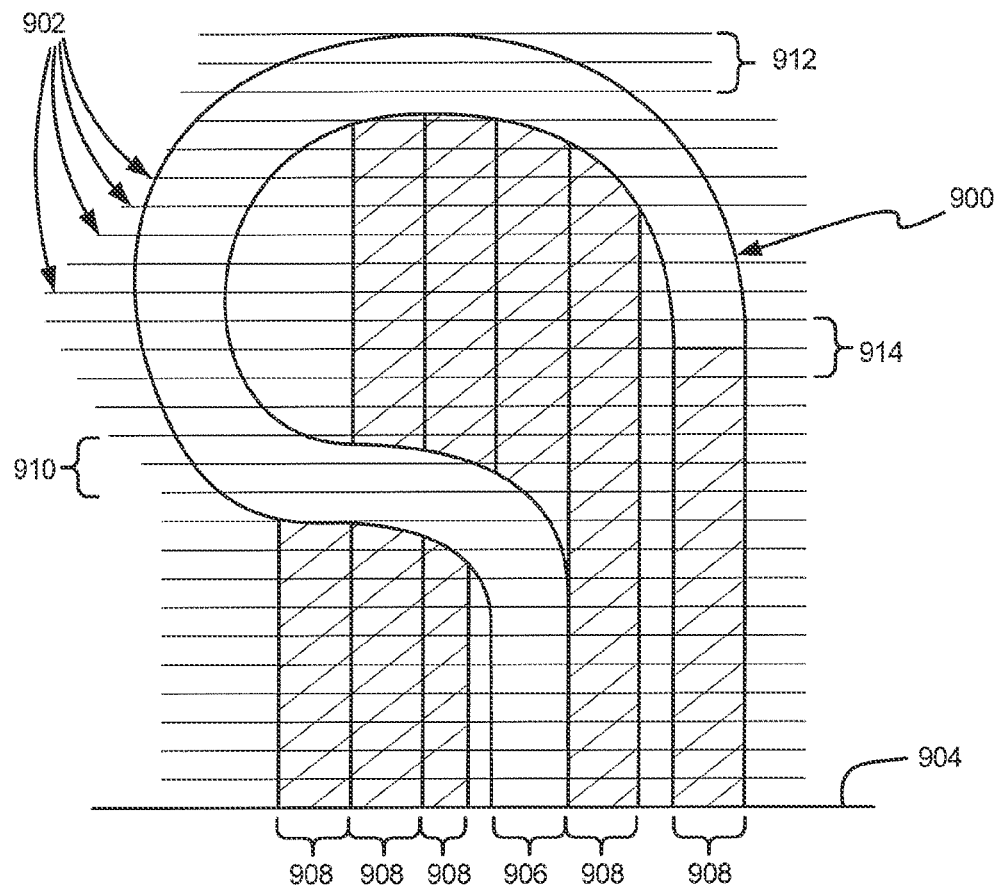
FIG. 9 is section view of a part and support structure according to a print method of the prior art.

For example, near-net parts of more complex shape, such as part 900 shown in cross-section in FIG. 9, are very time consuming, and support dependent, when printed using traditional layer by layer methods. In a layer by layer method of printing part 900, which is an elongated tubular member, such as a muffler pipe or other curved hollow pipe, a layer by layer printing method would slice the part into a number of layers indicated at layer lines 902. For each layer, starting at a bottom 904 of the part, the portion of the actual part 900 is indicated at section 906. Support structures for later portions of the part at later layer heights must also be deposited. Support structure is shown cross-hatched at sections 908 of the first layer at bottom 904. Support structures 908 are used to support portions of the part 900 that will be printed later in the layer by layer printing process, such as sections 910, 912, and 914. Support structure is typically printed using different material, so the first layer at bottom 904 of part 900 will be printed with part material for section 906, and with support material for sections 908.

Changing between part material and support material is typically accomplished by swapping of the print head, which involves one or more of moving the print head away from the part, swapping the print head itself, purging material from the new print head, and registering the new print head to the part, before printing of support material can begin. With each layer, at least one swapping of print head, with all the attendant operations, is performed. For nearly every layer of part 900, it can be seen that both part material and support material would need to be printed. This increases the print time, material cost, and post-processing time and expense. Further, at layers indicated especially at 910 and 912, the print layers do not follow the contours of the part 900 that would make the most sense in printing. That is, at portions 910 and 912, the layers of part material are substantially parallel to the longitudinal axis of the part 900 at that portion. This can lead to issues with stair-stepping (layer aliasing) at the part edge, as well as reduce the overall strength and quality of the part 900.

Figure 10:
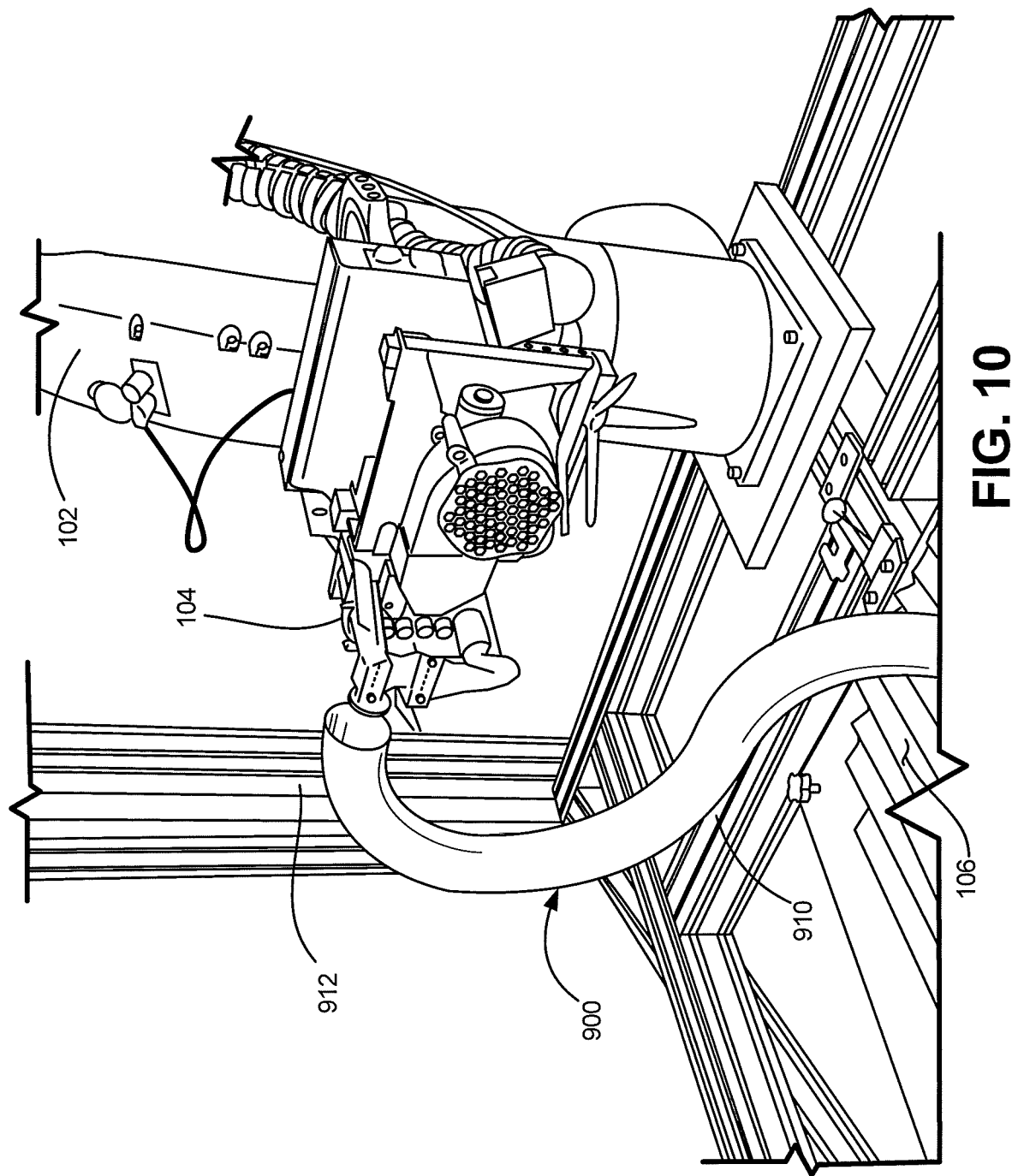
FIG. 10 is a perspective view of an embodiment of the present disclosure printing a part such as the part shown in FIG. 9.

A part such as part 900 which when sliced for additive manufacturing is difficult to properly produce in a near-net fashion with planar tool paths, for example having problems with stair-stepping (layer aliasing) and strength, can be printed with embodiments of the present disclosure, for example, using the 3D continuous tool path, to have consistent strength throughout. FIG. 10 shows an embodiment of printing part 900 using system 100. Embodiments of the present disclosure allow for the printing of the same part 900 with no support structure, as is shown in FIG. 10. Further, the single 3D tool path enabled by the embodiments of the present disclosure allows for the building of the part 900 with consistent longitudinal strength, since the helical tool path of the print head can consistently align with the structurally sound orientation of the material deposition. In FIG. 10, the multiple axis robotic build system 100 prints the part 900 starting at its bottom, and using a single helical tool path that traces the exterior of the part 900 and aligns along the longitudinal axis of the tubular part. As is seen in FIG. 10, the area 912 is being printed, with a tool path for the print head 104 that reduces or eliminates stair-stepping (layer aliasing) and supports, thereby printing the part 900 more quickly, using less material, and along its geometry so as to make the part 900 consistent and strong. Embodiments of the present disclosure may be used to vary strength of parts being printed, using alignment and orientation of fibers in print material, as well as with composition of layers, including extrusion on existing parts and at different orientations, providing even and consistent strength for most geometries, or specifically varying the strength or flexibility within portions of a part by varying build pattern, density or composition.

Another representative part that is easily built with embodiments of the present disclosure is a part having, for example, an internal lattice structure normal to a surface of the part. Embodiments of the present disclosure allow for printing of such a part, using the eight axes of motion between the robotic arm and build platform. Examples of parts that may be printed using method and apparatus embodiments of the present disclosure that are not amenable to printing with standard fused deposition modeling techniques and machines include wing tips of an airplane wing, such as parts that curve upward at their end, and which need to be structurally strong, often including a honeycomb lattice within the inner structure of the wing, with the lattice structure being specifically aligned in a proper orientation to the inner portion of the wing.

Figure 11:
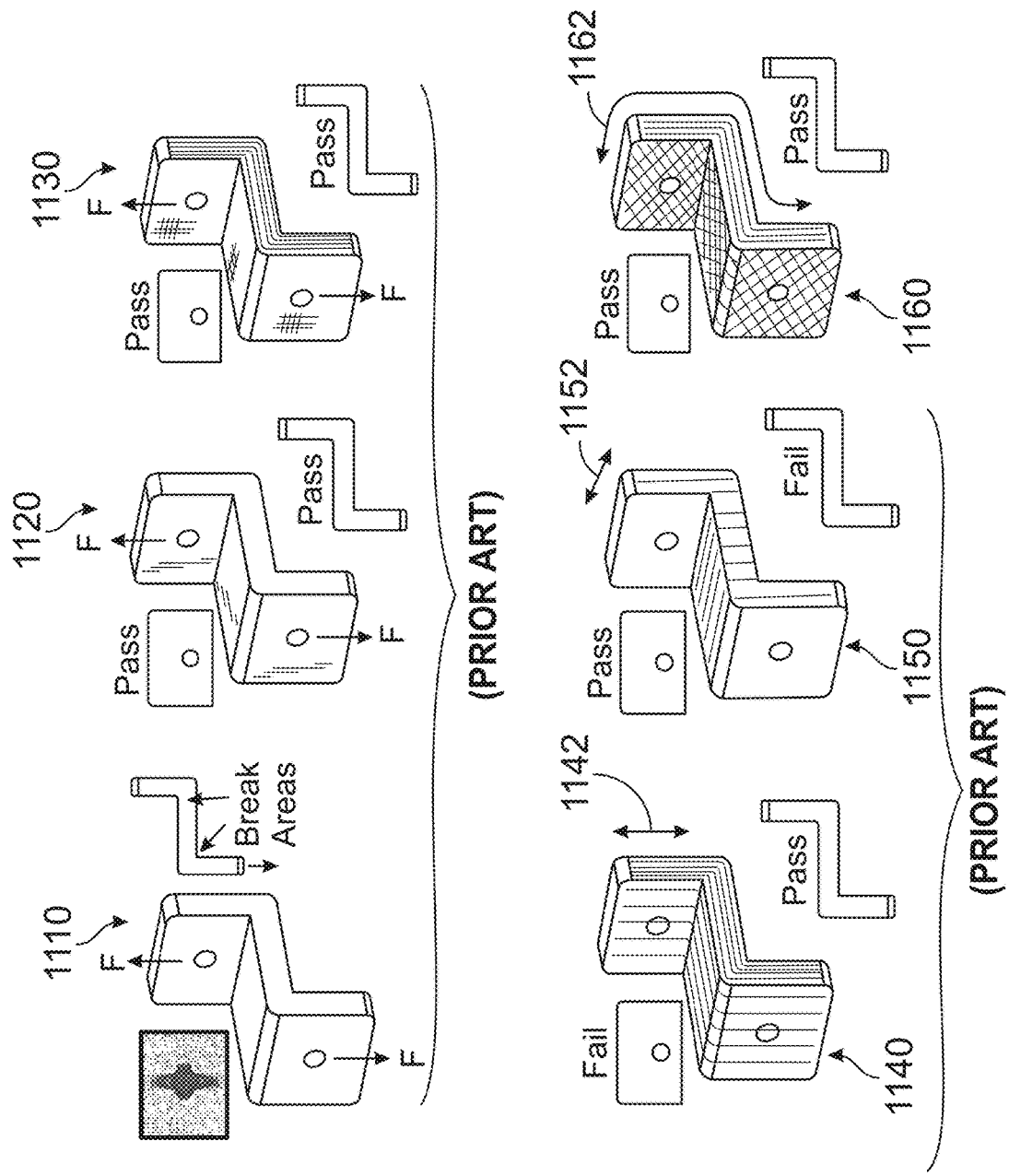
FIG. 11 is a view of a series of parts showing strengths and weaknesses thereof including a part printed according to embodiments of the present disclosure.

FIG. 11 illustrates limitations of current layer-by-layer fused deposition modeling print techniques. Part 1110 illustrates a part with stress and strength requirements around stress points and break points. A metal part provides strength and stress performance suitable for use, as shown at part 1120. A composite laminate part 1130 also passes stress and strength tests. Parts 1140 and 1150, printed with layer by layer extrusion processes, in which layers are printed along arrow 1142 in part 1140 and along arrow 1152 in part 1150, fail one of the stress or strength tests and pass the other test. The layer by layer print model of current fused deposition modeling printing systems is limited to a singular build plane and does not allow optimization of the part quality or build process by printing along multiple axes or multiple build planes. However, a part 1160 printed using the embodiments of the present disclosure, along multiple axes with a tool path that travels in all directions as indicated by arrow 1162, provides a completed part that can pass strength and stress tests dues to the ability of the embodiments of the present disclosure to align composites and print orientations to provide strength and stress parameters that meet requirements.

Figure 12:
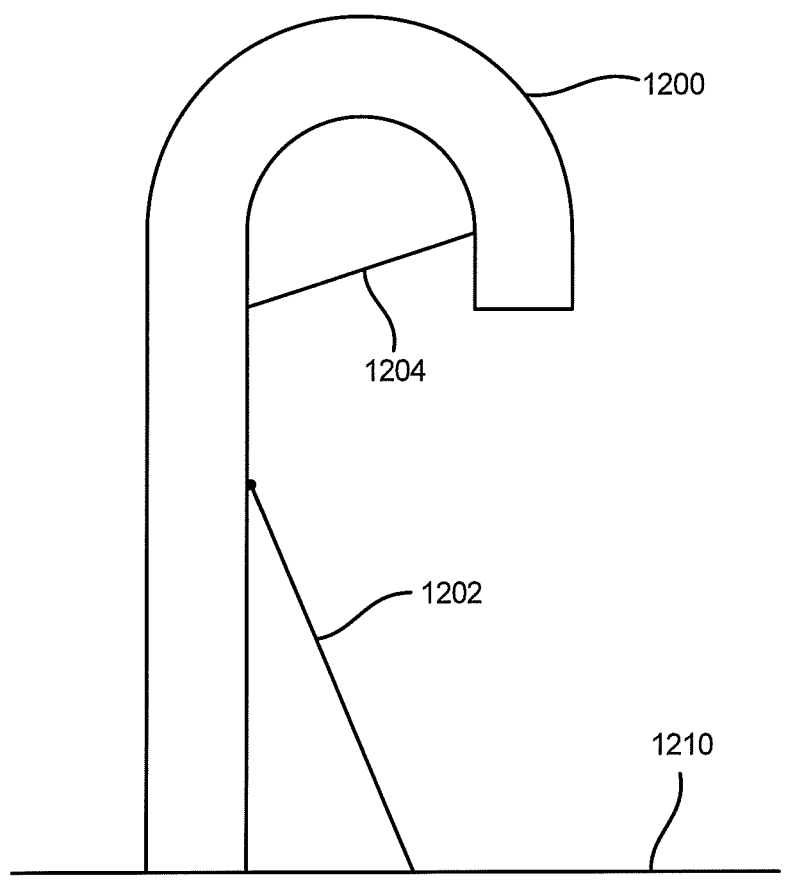
FIG. 12 is an elevation view of a part and point to point support structures according to an embodiment of the present disclosure.

Printing in multiple degrees of freedom, with or without localized cooling, also allows for the use of narrow, point to point support structures. For example, FIG. 12 shows support structures tacked between a part 1200 and a support surface 1210 (1202) and between separate spots on a part (1204), respectively. Thin support structures such as 1202 and 1204 are not possible in a layer by layer printing operation. Such thin support structures are rapidly printable, and do not use as much material as traditional support structures. Interpart structures such as 1204 may be used, for example, could be used to reduce compression or sagging of portions of a part without using a full traditional support structure built from the build plane up.

Embodiments of the present disclosure are amenable to printing outside of an oven or other heated enclosure. The embodiment of FIG. 1 is shown in an out-of-oven environment. In a printing environment not confined to an oven, such as printing out-of-oven, the equilibrium temperature of an unfinished part is roughly equivalent to the temperature of the environment. This, unlike in-oven printing, can significantly reduce the window in which adhesion of new material to previously printed material, as well as other build properties, can be achieved.

However, print techniques such as localized heating of previously printed portions of the part along a tool path, followed by extrusion of material along the tool path to increase bonding between the layers of material can be utilized in heated build environments, including build chambers. Additionally, localized cooling of the recently extruded material along the tool path can be utilized to maintain the thermal stability of the part being printed.

Embodiments of the present disclosure use pre-heating of portions of a part, for example using a laser system, a gas jet system, or a combination of laser and gas jet systems. Referring back to FIG. 1, the heater 120 may, in an alternative, be a pre-heating gas jet, laser heater, or combination thereof as discussed herein. Using pre-heating, the build properties and adhesion desired for part printing may be enhanced. Such enhancements enable the building out-of-oven of parts similar to or better than in-oven build quality.

Further, such enhancements enable new families of material for use in part building out of oven.

When pre-heating is accomplished using a laser pre-heater, heating energy is applied to a small area of previously printed layer, immediately before, or substantially immediately before, the deposition of a new bead of material. In one embodiment, this pre-heats a cooler side of the interface shared between the new layer and previous layers, and improves adhesion between the new layer and the previous layer. This pre-heating also enables the use of high temperature materials that would not otherwise adhere to themselves well or at all in an out of oven environment.

An array of laser elements may be used in one embodiment. In embodiments of the present disclosure in which a precomputed and known tool path and layer plane shape is used, such an array of laser elements may be used instead of a single laser source. In such a configuration, individual elements of the full laser array can be engaged to apply laser heating only where needed. This prevents overheating adjacent tool paths, especially in tightly packed raster patterns where a print head rapidly returns to nearly the same spot on the part within a span of time that typically does not allow for full cooling. Furthermore, by varying laser power, the amount of adhesion gained from pre-heating can be controlled. As laser energy is not bounded by a specific maximum temperature, laser pre-heating is limited only by a maximum temperature that the polymer compound used for printing can reach before degradation occurs.

When pre-heating is accomplished using a gas jet, a focused, high speed, high temperature flow of air directs heat onto a deposition path, for example, just ahead of a print head. Similar energy input to a laser system can be gained. However, maximum temperature may be limited. That is, hot gas can be introduced at a specific temperature, and there is no risk of the part temperature exceeding the temperature of the gas. The choice of gas in one embodiment is an inert gas. Air could be used, or other gases, depending upon a desired temperature for the pre-heating. By using a gas other than air, in one embodiment an inert gas, higher temperatures could be achieved than in a locally air based environment due to the reduced likelihood of polymer degradation in an inert environment.

Further, depending on design and capability of a gas jet pre-heater, such a jet could also be used, with a different gas or the same gas at a different temperature, to provide cooling, pre- or post-printing. An array of gas jets may also be provided, allowing for directionally controlled heating and cooling simultaneously. By applying forced convection with a gas jet or gas jet array using room temperature or colder air/gas, a material bead may be rapidly cooled immediately before or after extrusion. Other fluids can also be utilized to cool the previously deposited material, including, but not limited to, liquid nitrogen. Post-cooling enables, for example, large bead diameter extrusion to be utilized with short return times, such as a raster pattern to reduce the time required to print parts; increased bridging distances; tailored adhesion, especially when combined with pre-heating; and control of material morphology. Pre-cooling enables, for example, creation of weak points or failure points in a part at specific spots within the part, for example by reducing adhesion.

Bead precooling in one embodiment allows a part to be printed with the capability to purposefully disrupt the development of adhesion in specific spots within the part. This may be used, for example, to introduce intentionally weakly adhered zones into the part itself, such as would be necessary to mitigate failure by channeling energy to a specific failure site instead of another more critical area of the object. Also, it may be used to target a localized region for breakout, such as a future hole, after build. Further, this may be used, for example, to reduce adhesion between the object and another build of a model to be used as support. In some configurations, a model material will sufficiently adhere to previously printed material. However, by intentionally cooling one surface of a part prior to deposition, the shared interface will not achieve the best temperatures for good adhesion. This allows the formation of tailored adhesion at these model to model as support interfaces.

Localized pre-heating of a portion of a part, or a portion of a tool path, prior to deposition, allows for the use of multiple different materials in a 3D printing operation. By pre-heating small depths of material over small times in an out of oven environment, instead of keeping the complete object at an elevated temperature in an oven, multiple materials can be printed together. This is enabled in one embodiment by the local pre-heating of one of the two materials to the compatible temperature range of the second of the two materials, enabling adhesion to develop in an otherwise unusable temperature range such as the temperature used when printing in oven. Switching from one thermoplastic material to another in the same part typically has not been feasible in a controlled temperature oven environment, because each material requires a particular build temperature range associated with its material melt characteristics. By utilizing localized build temperature control through pre-heating and/or precooling, switches in material deposition can be made mid-build. By way of example only and not by way of limitation, local pre-heating in an out of oven embodiment would also allow for the printing of an elastomer on a structural material, both of which sufficiently adhere in different temperature ranges. Because the temperature is raised locally, the temperature control can be done over a short time period, so that part stability is maintained.

In one embodiment, additives are added to the print material to alter the acceptance of energy sources. Additives, by way of example only and not by way of limitation, include carbon black and/or dyes. Additives are used in one embodiment to create print materials that perform in certain ways under certain conditions. The use of additives further eases the use of different materials in the same part. This material tuning allows certain wavelengths of laser energy, for example, to have different effects on different materials. For example, when a laser source emits energy at a wavelength that a target print material absorbs energy, the material may respond differently that base material without additives.

In one embodiment, an emitting wavelength of a laser pre-heating source is known, and, through use of additives, a material to be printed is modified, such as with the use of additives, to create a material with a different range of acceptance or rejection of heating energy sources. Such modifications tune the material to absorb or reject energy, for example, at a particular wavelength or range of wavelengths. Tuning to visible wavelengths, infrared wavelengths, ultraviolet wavelengths, and the like can be performed with the use of additives. Responses of materials to various wavelength energy depends upon a variety of physical and chemical characteristics, for example. Different materials also have different responses to different additives, and can allow for further tuning. Additives may be employed to, for example, control absorptivity, control conductivity, control specific heat capacity, and the like, of print material. Tuning of materials therefore allows materials that have different melting and adhesion temperatures to be joined in an out of oven configuration, with the assistance of local pre-heating and precooling.

Further embodiments use local pre-heating and/or pre-cooling to determine part characteristics of a part or a portion thereof. For example, depending on part structure, minimum return time, print bead size, and the like, pre-heating and/or pre-cooling can make residual stress localized. For example, pre-stress points may be built in, or pre/post heating and cooling can be used to reduce residual stress by tuning temperature profile of beads, for example, to elongate cooling time for a small bead, and/or decrease cooling time for a large bead. In oven builds cannot accomplish this.

While pre- and post-heaters and pre- and post-coolers are shown in close proximity to the print head in some embodiments, it should be understood that the placement of pre- and post-heaters and pre- and post-coolers may be modified within the scope of the present disclosure.

Minimum return time is the time between the deposition of a bead at a point on one layer and the deposition of a bead at the same point on the next layer. During a part build, heat is transferred out of deposited beads by conduction and convection into the previous layers and environment, respectively. For small bead diameters and sufficiently large parts, heat from newly deposited beads is sufficiently transferred away by the time new material is deposited atop.

Minimum return time becomes a factor for small features and for near-net part creation, as well as increased manufacturing extrusion rates, where resin does not have time to transfer sufficient energy into its surroundings before the next layer is deposited, and for large bead sizes. In fact, for sufficiently small features or large bead sizes, temperature runaway within a part is possible. In this case, temperature in the previous layers increases over repeated depositions. This results in increasingly slow cooling of the newest layer and potential mobility of previous layers, which should remain effectively locked into shape after their own deposition. In some printers, return time is artificially lengthened to ensure that a previously deposited layer is sufficiently below a critical temperature before deposition of a new layer.

However, this may not be feasible for large beads which carry much greater thermal mass than smaller beads. For very large bead diameters, regardless of feature size, minimum return time lengthens from tens of second to many minutes, dramatically increasing the total build time, especially for small to moderately sized features. Not only do these large diameter beads require long cooling times, but they may also remain mobile long enough that they will distort and sag under their own weight before solidifying, again leading to failure. Rapid cooling of large diameter beads allows for their use, widening the range of bead and feature size.

Embodiments of the present disclosure counter a buildup of heat with rapid localized cooling. By rapidly removing heat (in one embodiment a specific amount of heat) shortly after deposition, the minimum return time is reduced, allowing both rapid building of small features and the use of large diameter beads, ultimately reducing build time while reducing potential part failure or non-failure distortions. In one embodiment, the amount of heat removed is sufficient to cool the part against deformation, but not so much as to prevent adhesion.

In the presence of localized cooling, localized heating is also used in one embodiment. As localized heating promotes adhesion, localized cooling inhibits it. Thus, local pre-heating prior to deposition allows increased adhesion, and localized rapid cooling locks bead shape and reduces minimum return times.

Post cooling with a gas jet, as opposed to a fan blowing ambient air, allows for greater bridging distances of unsupported or underneath bead regions than in-oven print environments. Using more effective gas jet cooling, beads may be solidified more quickly, further extending the bridging distance. For bridging, pre-heating of an upcoming junction is applied in order to maintain sufficient adhesion at the bridge union site. The capability to rapidly cool large diameter beads which have a larger thermal mass and thus cool more slowly than thinner beads allows for reduction of minimum return time, and increased part integrity. This enables lower usage and build times for current support structures, as well as new types of support structures, such as tack supports as described herein.

For semi-crystalline polymers, or for alloys incorporating semi-crystalline polymers, relative crystallinity is a function of the temperature and temperature rate of change. Generally, a slower cooling process yields more relative crystallinity than a more rapid cooling process. One post-cooling embodiment rapidly drives a recently extruded material through its crystallization range, leaving it relatively amorphous as compared to a material which cooled more slowly. Conversely, post-heating using, for example, a pre-heater such as a laser pre-heater, gas jet pre-heater, or combination thereof, the material could be kept at a higher temperature for longer, enabling the formation of more crystallites.

Figure 13:
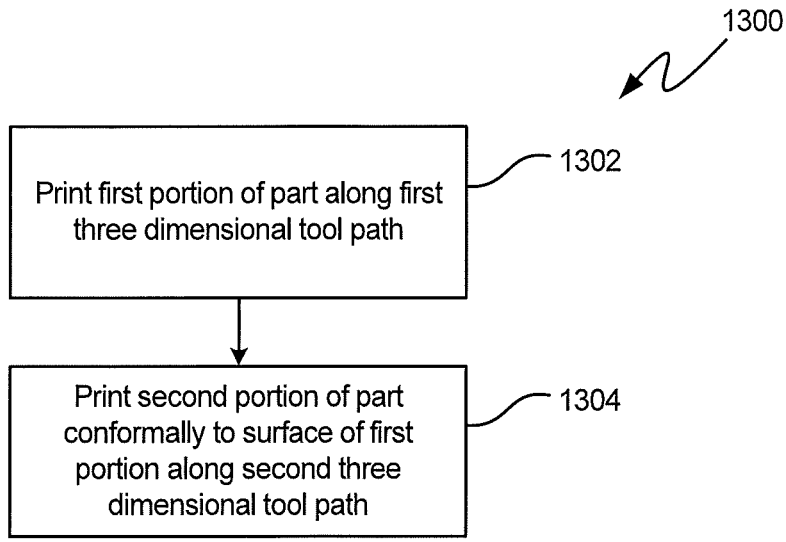
FIG. 13 is a flow chart of a method according to an embodiment of the present disclosure.

FIG. 13 is a flow chart of a method 1300 of printing a 3D part with an additive manufacturing system. Method 1300 comprises printing a first portion of the part along a first 3D tool path in block 1302. A second portion of the part is printed conformally to a surface of the first portion of the part along a second 3D tool path in block 1304.

Figure 14:
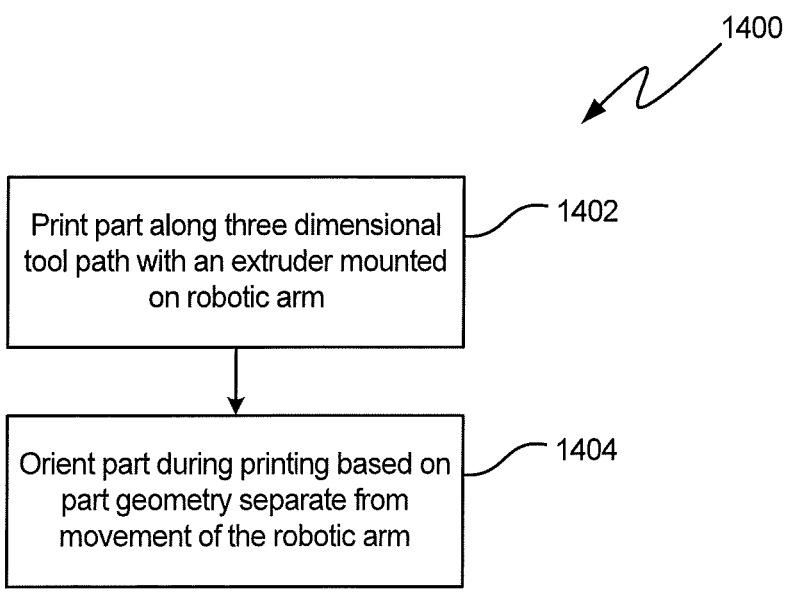
FIG. 14 is a flow chart of a method according to another embodiment of the present disclosure.

FIG. 14 is a flow chart of another method 1400 of printing a 3D part with a multiple axis robotic build system. Method 1400 comprises printing the part along a 3D tool path with an extruder mounted on a robotic arm that moves in six degrees of freedom in block 1402. The part is oriented during printing based on geometry of the part being printed separate from the movement of the robotic arm in block 1404.

Figure 15:
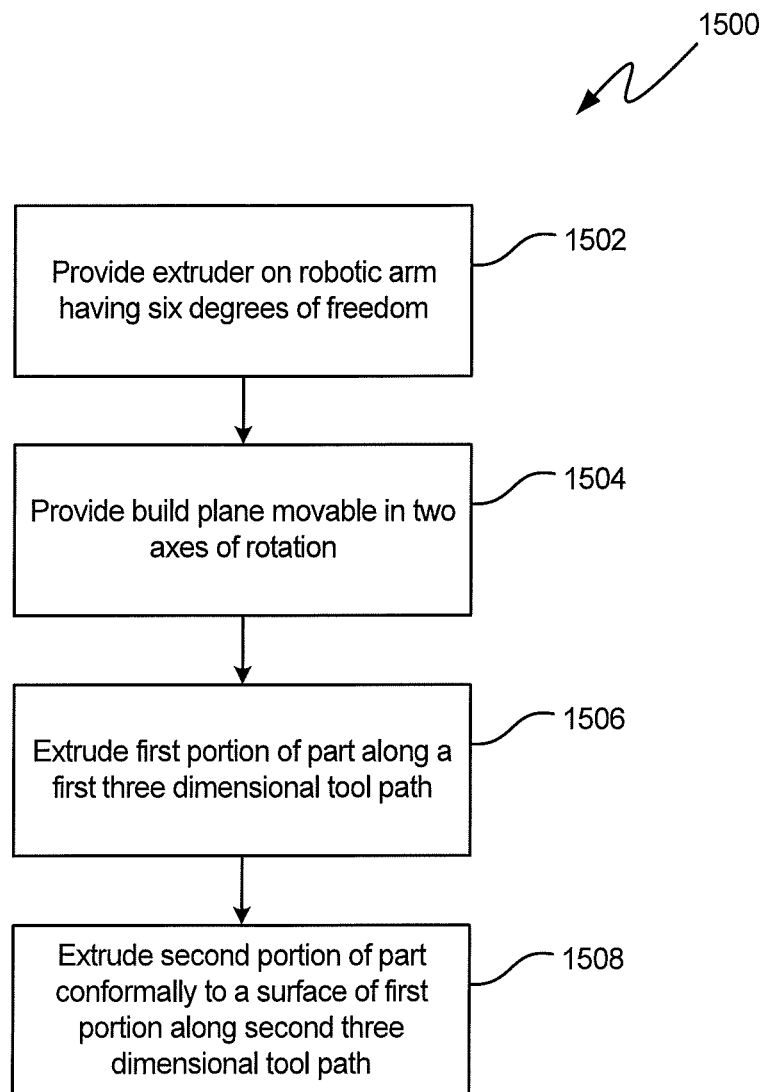
FIG. 15 is a flow chart of a method according to another embodiment of the present disclosure.

FIG. 15 is a flow chart of a method 1500 of out of oven printing of a 3D part. Method 1500 comprises providing an extruder on a robotic arm having six degrees of freedom in block 1502, and providing a build plane movable in two axes of rotation in block 1504. A first portion of the part is extruded along a first three-dimensional tool path in block 1506. A second portion of the part is extruded conformally to a surface of the first portion of the part along a second 3D tool path in block 1508. Extruding a second portion of the part comprises locally pre-heating a portion of the second 3D tool path of the second portion of the part prior to extruding on that portion of the tool path.

Figure 16:
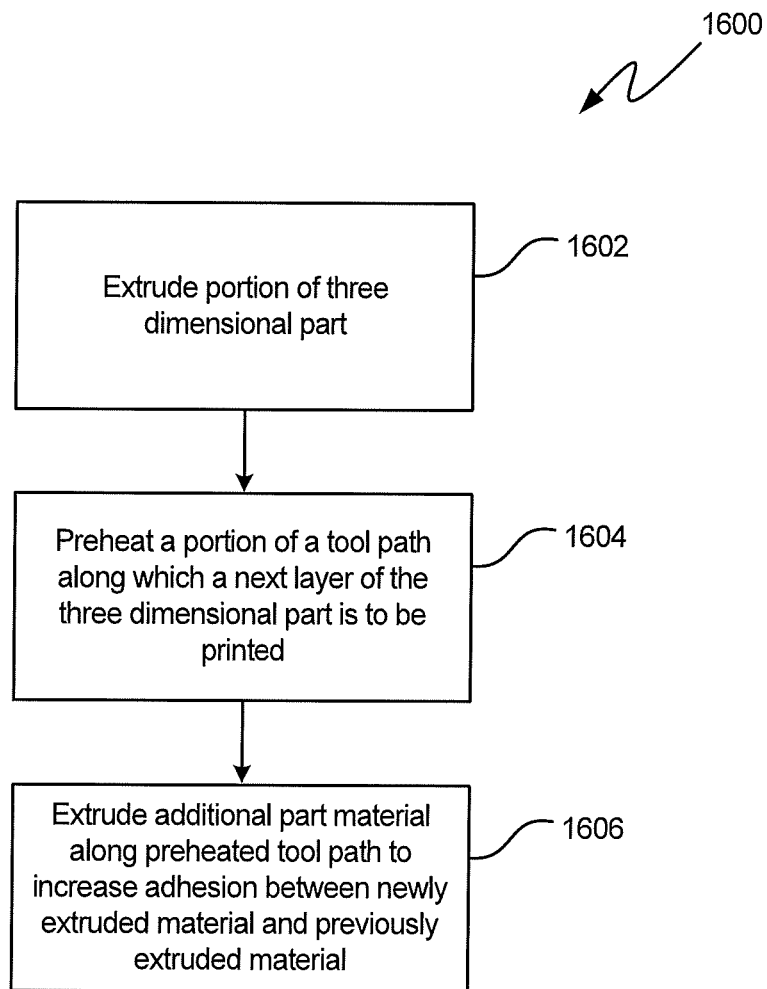
FIG. 16 is a flow chart of a method according to another embodiment of the present disclosure.

FIG. 16 is a flow chart of another method 1600 of printing a 3D part. Method 1600 comprises extruding a portion of the 3D part in block 1602, and pre-heating the portion of the tool path along which a next layer of the 3D part is to be printed in block 1604. Additional part material is extruded along the pre-heated tool path to increase adhesion between the newly extruded material and the previously extruded material in block 1606

While embodiments of the present disclosure are described with respect to a multi-axis printing system, it should be understood that embodiments of the present disclosure may also be used with both additive and subtractive manufacturing processes. Embodiments of the apparatus and methods of the present disclosure provide a true 3D printing process using a combination of robots with positioners, cradles, gantries, and the like, to align the printing process with geometries of the part to be printed, along a single tool path or multiple single tool paths including printing of portions of the part conformally onto existing previously printed portions of the part.

What is claimed is:

1. A multiple axis robotic additive manufacturing system, comprising:
   a robotic arm movable in six degrees of freedom;
   a build platform movable in at least two degrees of freedom independent of movement of the robotic arm to position a part being built on the build platform so as to counteract effects of gravity based upon a geometry of the part;
   an extruder mounted at an end of the robotic arm and configured to extrude material with a plurality of flow rates;
   a controller configured to synchronize movement of the robotic arm and the build platform with a flow rate of the material being extruded so as to print the part along a continuous 3D tool path to comprise a net or near-net, elongated hollow member having a length and a diameter following a complex curvature and having overhanging or free space segments without support structures; and
   a pre-heater configured to locally pre-heat a previously printed portion of the part along the 3D tool path prior to extrusion of material along the 3D tool path by the extruder to print a subsequent portion of the part on the previously printed portion of the part.

2. The multiple axis robotic additive manufacturing system of claim 1, wherein the build platform is configured to rotate about a central axis thereof.

3. The multiple axis robotic additive manufacturing system of claim 1, wherein the build platform is configured to tilt from substantially vertical to substantially horizontal.

4. The multiple axis robotic additive manufacturing system of claim 1, wherein the build platform is configured to rotate about a central axis thereof and to tilt from substantially vertical to substantially horizontal.

5. The multiple axis robotic additive manufacturing system of claim 1, wherein the robotic arm is mounted on a rail or a gantry to provide additional degrees of freedom.

6. The multiple axis robotic additive manufacturing system of claim 1, wherein the pre-heater comprises a gas jet heater, a laser source heater, or a hybrid gas jet and laser pre-heater.

7. The multiple axis robotic additive manufacturing system of claim 1, and further comprising a cooler configured to actively cool the extruded material along the 3D tool path.

8. The multiple axis robotic additive manufacturing system of claim 7, wherein the cooler is a gas jet cooler.

9. The multiple axis robotic additive manufacturing system of claim 1, and further comprising:
   a tool changer configured to change the extruder for another tool.

10. The multiple axis robotic additive manufacturing system of claim 9, wherein the tool changer is configured to change the extruder for a subtractive manufacturing tool.

11. A method of printing a 3D part with a multiple axis robotic additive manufacturing system according to claim 1, the method comprising:
    using the extruder to print the hollow member as a first portion of the part on the build platform by extruding a first thermoplastic material along the continuous 3D tool path as a first 3D tool path;
    orienting the part during the extruding by moving the build platform based on a geometry of the first portion of the part and using the controller to synchronize movement of the build platform and movement of the robotic arm with the flow rate of the material being extruded; and
    locally pre-heating a surface of the first portion of the part while using the extruder to extrude a second thermoplastic material along a second 3D tool path to form a second portion of the part, wherein the local pre-heating comprises pre-heating to approximately a temperature at which the second thermoplastic material will adhere to the first thermoplastic material of the first portion of the part;
    and wherein the second portion of the part has increased adhesion to the first portion of the part due to the pre-heating.

12. The method of claim 11, and further comprising changing a rate of the extrusion of the extruder based on geometry of the part, a speed of the robotic arm, a speed of the build platform, or combinations thereof.

13. The method of claim 11, wherein the first and second thermoplastic materials are different from one another.

14. The method of claim 11, wherein the first 3D tool path is a helical tool path.

15. The method of claim 11, wherein the first 3D tool path is a helical tool path and wherein the hollow member is a tubular member.

16. The method of claim 11, wherein the hollow member is a tubular member and the second portion of the part comprises a fin, and wherein the second 3D tool path forms a contact edge along which the second portion of the part is printed onto the first portion of the part.

17. The method of claim 11, wherein the second 3D tool path comprises planar tool path portions.

18. A method of out of oven 3D printing of a part using the multiple axis robotic additive manufacturing system according to claim 1, the method comprising:
    using the extruder to extrude the hollow member as a first portion of the part along the continuous 3D tool path as a first 3D tool path while using the controller to synchronize movement of the robotic arm and the build platform; and
    using the extruder to extrude a contact edge of a second portion of the part conformally to a surface of the first portion of the part along a second 3D tool path while using the controller to synchronize movement of the robotic arm and the build platform;
    wherein extruding a contact edge of a second portion of the part comprises locally pre-heating a portion of the first portion of the part along the second 3D tool path prior to extruding on that portion of the first portion of the part.

19. The method of claim 18, and further comprising actively cooling extruded material previously subjected to said pre-heating along the second tool path.

20. The method of claim 18, wherein the material of the first portion is different from the material of the second portion.

* * * * *